United States Patent
Nouvel et al.

(10) Patent No.: US 12,340,220 B2
(45) Date of Patent: Jun. 24, 2025

(54) REGISTER MAPPING TO MAP ARCHITECTURAL REGISTERS TO CORRESPONDING PHYSICAL REGISTERS BASED ON A MODE INDICATING A REGISTER LENGTH

(71) Applicant: Arm Limited, Cambridge (GB)

(72) Inventors: Quentin Éric Nouvel, Antibes (FR); Luca Nassi, Antibes (FR); Albin Pierrick Tonnerre, Nice (FR); Geoffray Matthieu Lacourba, Nice (FR)

(73) Assignee: Arm Limited, Cambridge (GB)

( * ) Notice: Subject to any disclaimer, the term of this patent is extended or adjusted under 35 U.S.C. 154(b) by 182 days.

(21) Appl. No.: 18/345,164

(22) Filed: Jun. 30, 2023

(65) Prior Publication Data
US 2025/0004767 A1    Jan. 2, 2025

(51) Int. Cl.
*G06F 9/30* (2018.01)
*G06F 9/38* (2018.01)

(52) U.S. Cl.
CPC ........ *G06F 9/3012* (2013.01); *G06F 9/30112* (2013.01); *G06F 9/30189* (2013.01); *G06F 9/384* (2013.01)

(58) Field of Classification Search
CPC .... G06F 9/384; G06F 9/30189; G06F 9/3012; G06F 9/30141
See application file for complete search history.

(56) References Cited

U.S. PATENT DOCUMENTS

| | | | | |
|---|---|---|---|---|
| 5,446,912 A | * | 8/1995 | Colwell | G06F 9/3836 712/E9.046 |
| 5,630,149 A | * | 5/1997 | Bluhm | G06F 9/384 712/217 |
| 5,835,748 A | * | 11/1998 | Orenstein | G06F 9/30014 712/217 |
| 6,240,507 B1 | * | 5/2001 | Derrick | G06F 9/3836 712/217 |
| 7,840,783 B1 | * | 11/2010 | Singh | G06F 9/384 712/217 |
| 2003/0135713 A1 | * | 7/2003 | Rychlik | G06F 9/3013 712/E9.05 |

(Continued)

Primary Examiner — Keith E Vicary
(74) Attorney, Agent, or Firm — NIXON & VANDERHYE P.C.

(57) ABSTRACT

Mode change detection circuitry detects a mode change when processing circuitry switches between first and second modes of processing in which a first set of architectural registers are designated as having different register lengths. Register mapping circuitry maps architectural registers to corresponding physical registers. For an operation specifying a given architectural register of the first set of architectural registers: in response to a determination that the operation is to be processed in the first mode of processing, the register mapping circuitry maps the given architectural register to a physical register of a first physical register file, and in response to a determination that the operation is to be processed in the second mode of processing, the register mapping circuitry maps the given architectural register to a physical register of a second physical register file separate from the first physical register file and having physical registers of different register length to physical registers of the first physical register file.

20 Claims, 16 Drawing Sheets

(56) References Cited

U.S. PATENT DOCUMENTS

| | | | |
|---|---|---|---|
| 2005/0172108 A1* | 8/2005 | Wu | G06F 9/30189 |
| | | | 712/228 |
| 2008/0016324 A1* | 1/2008 | Burky | G06F 9/3851 |
| | | | 712/217 |
| 2008/0162898 A1* | 7/2008 | Gschwind | G06F 9/3012 |
| | | | 712/225 |
| 2008/0209166 A1* | 8/2008 | Moudgill | G06F 9/3836 |
| | | | 712/E9.071 |
| 2011/0320765 A1* | 12/2011 | Karkhanis | G06F 9/30109 |
| | | | 712/7 |
| 2015/0178085 A1* | 6/2015 | Hertzberg | G06F 9/30189 |
| | | | 712/229 |
| 2023/0305852 A1* | 9/2023 | Asanovic | G06F 9/3013 |

* cited by examiner

REGISTER MAPPING TO MAP ARCHITECTURAL REGISTERS TO CORRESPONDING PHYSICAL REGISTERS BASED ON A MODE INDICATING A REGISTER LENGTH

BACKGROUND

Technical Field

The present technique relates to the field of data processing.

Technical Background

An apparatus for data processing may have register mapping circuitry for mapping (or "rename") architectural registers identified by instructions to physical registers provided in hardware. Register renaming can be useful, for example, in an out-of-order processor to improve performance by removing some false register dependencies between instructions, to increase opportunities for a younger instruction in program order to bypass an older instruction in the program order.

SUMMARY

At least some examples of the present technique provide an apparatus comprising:
mode change detection circuitry to detect a mode change when processing circuitry switches between a first mode of processing in which a first set of architectural registers are designated as having a first register length and a second mode of processing in which the first set of architectural registers are designated as having a second register length different to the first register length; and
register mapping circuitry to map architectural registers to corresponding physical registers;
wherein for an operation specifying a given architectural register of the first set of architectural registers:
in response to a determination that the operation is to be processed in the first mode of processing, the register mapping circuitry is configured to map the given architectural register to a physical register of a first physical register file; and
in response to a determination that the operation is to be processed in the second mode of processing, the register mapping circuitry is configured to map the given architectural register to a physical register of a second physical register file separate from the first physical register file, the second physical register file comprising physical registers of different register length to physical registers of the first physical register file.

At least some examples of the present technique provide a system comprising: the apparatus described above, implemented in at least one packaged chip; at least one system component; and a board, wherein the at least one packaged chip and the at least one system component are assembled on the board.

At least some examples of the present technique provide a chip-containing product comprising the system described above assembled on a further board with at least one other product component.

At least some examples of the present technique provide a non-transitory computer-readable medium to store computer-readable code for fabrication of an apparatus comprising: mode change detection circuitry to detect a mode change when processing circuitry switches between a first mode of processing in which a first set of architectural registers are designated as having a first register length and a second mode of processing in which the first set of architectural registers are designated as having a second register length different to the first register length; and
register mapping circuitry to map architectural registers to corresponding physical registers;
wherein for an operation specifying a given architectural register of the first set of architectural registers:
in response to a determination that the operation is to be processed in the first mode of processing, the register mapping circuitry is configured to map the given architectural register to a physical register of a first physical register file; and
in response to a determination that the operation is to be processed in the second mode of processing, the register mapping circuitry is configured to map the given architectural register to a physical register of a second physical register file separate from the first physical register file, the second physical register file comprising physical registers of different register length to physical registers of the first physical register file.

At least some examples of the present technique provide a method comprising:
mapping architectural registers to corresponding physical registers; and
detecting a mode change when processing circuitry switches between a first mode of processing in which a first set of architectural registers are designated as having a first register length and a second mode of processing in which the first set of architectural registers are designated as having a second register length different to the first register length;
wherein for an operation specifying a given architectural register of the first set of architectural registers:
in response to a determination that the operation is to be processed in the first mode of processing, the given architectural register is mapped to a physical register of a first physical register file; and
in response to a determination that the operation is to be processed in the second mode of processing, the given architectural register is mapped to a physical register of a second physical register file separate from the first physical register file, the second physical register file comprising physical registers of different register length to physical registers of the first physical register file.

Further aspects, features and advantages of the present technique will be apparent from the following description of examples, which is to be read in conjunction with the accompanying drawings.

DESCRIPTION OF EXAMPLES

Figure 1:
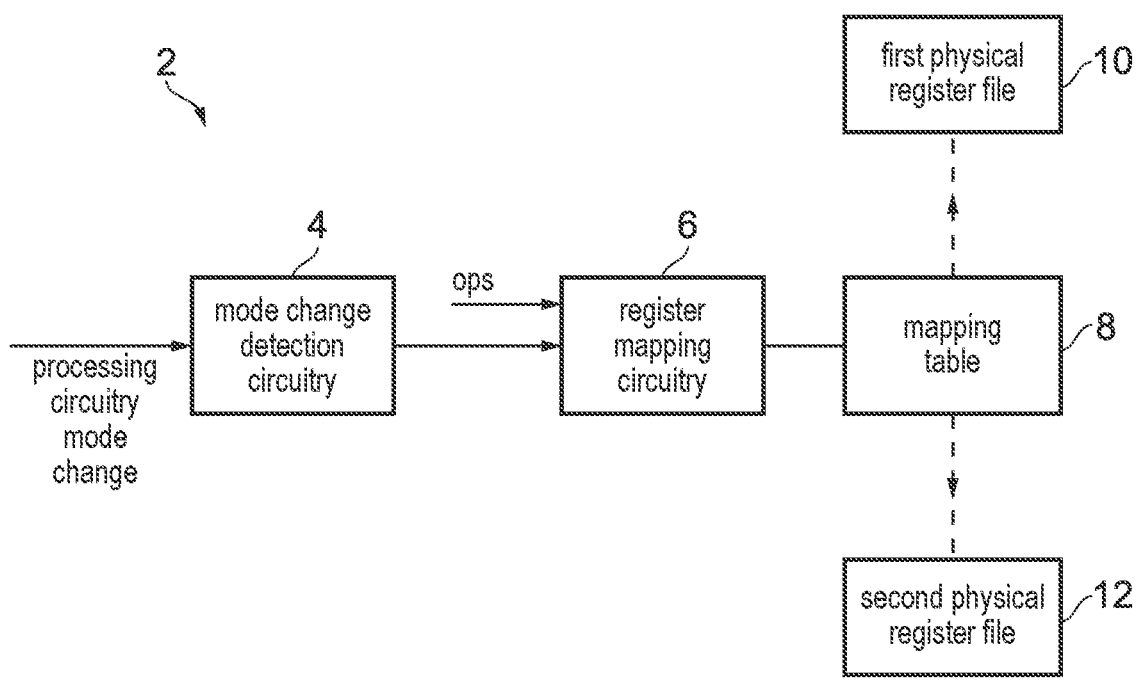
FIG. 1 illustrates an apparatus comprising mode change detection circuitry and register mapping circuitry.

An apparatus comprises mode change detection circuitry to detect a mode change when processing circuitry switches between a first mode of processing in which a first set of architectural registers are designated as having a first register length and a second mode of processing in which the first set of architectural registers are designated as having a second register length different to the first register length. Supporting modes of processing associated with different architectural register lengths can be useful to provide the ability to trade off processing throughput against energy efficiency.

One possible approach for supporting such first and second modes of processing in hardware could be to provide a physical register file sized according to the largest architectural register length supported in the first and second processing modes, and use that same physical register file for the first set of architectural registers in both the first and second processing modes. In the processing mode where a smaller architectural register length is needed, a smaller portion of each physical register of that physical register file would be accessed to provide the data for architectural registers of shorter architectural register length. In such an example, the physical registers used in the second mode to provide data for the first set of architectural registers share physical storage hardware with the physical registers used in the first mode to provide data for the first set of architectural registers. However, a disadvantage of this approach is that, compared to a processor which does not support the mode of processing having the largest architectural register size, the size of the shared physical register file is expanded which incurs additional cost in power and circuit area.

In the examples discussed below, register mapping circuitry is provided to map architectural registers to corresponding physical registers. For an operation specifying a given architectural register of the first set of architectural registers:

in response to a determination that the operation is to be processed in the first mode of processing, the register mapping circuitry is configured to map the given architectural register to a physical register of a first physical register file; and in response to a determination that the operation is to be processed in the second mode of processing, the register mapping circuitry is configured to map the given architectural register to a physical register of a second physical register file separate from the first physical register file, the second physical register file comprising physical registers of different register length to physical registers of the first physical register file.

Hence, the register mapping circuitry varies which of two physically distinct physical register files is selected for mapping architectural registers of the first set of architectural registers. While one might think that selectively mapping the first set to architectural registers to first or second physically distinct physical register files would increase the circuit area requirement, in practice there may already be a second physical register file available which is used for another set of architectural registers, and so by mapping the first set of architectural registers to the second physical register file in the second mode but to the first physical register file in the first mode, this can often avoid needing to increase the amount of register storage provided in total compared to a system supporting a shorter architectural register length for the first set of architectural registers. Hence, counter-intuitively, providing the register mapping circuitry with the ability to vary which physically separate physical register file is used to provide physical registers mapped to the first set of architectural registers can help to save circuit area and reduce power consumption.

The register length for physical registers of the second physical register file may be longer than the register length for physical registers of the first physical register file. Also, a maximum length supported by the apparatus for the second register length may be greater than a maximum length supported by the apparatus for the first register length.

For an operation specifying a selected architectural register of a second set of architectural registers, the register mapping circuitry may map the selected architectural register to a physical register of the second physical register file regardless of whether the operation is to be processed in the first mode of processing or the second mode of processing. For example, the second physical register file may be a register file already provided for mapping to the second set of architectural registers (which may have a longer architectural register length than the architectural register length required for the first set of architectural registers in the first mode). The second physical register file may provide the second register length required for the second processing mode. Therefore, by enabling the first set of architectural registers to be mapped to the second physical register file for operations processed in the second mode, it is not necessary to expand the first physical register file to support the second register length, allowing circuit area and power consumption to be reduced.

The first and second sets of architectural registers could be any two distinct sets of architectural registers defined in an instruction set architecture (ISA). The ISA may define a different purpose for the first set of architectural registers compared to the second set of architectural registers.

In some examples, the second set of architectural registers comprise general purpose scalar registers for providing operands for scalar processing operations.

In some examples, the first set of architectural registers comprise predicate registers for providing predicate values for predicating SIMD (single instruction multiple data)

operations. SIMD operations may include vector processing operations, matrix processing operations or other operations performed on operands representing a number of independent data elements. The predicate values can be used to indicate which lanes of a SIMD operand, SIMD operation or SIMD result are to be masked, to prevent processing operations for those lanes influencing the result. Predication of SIMD operations can be useful to implement vectorised loops where the number of vector elements to process may be unknown at compile time but can dynamically vary at runtime, or to implement conditional operations where for each lane of SIMD processing, whether the corresponding operation is needed depends on a test condition applied to a corresponding SIMD element in an operand or result value.

The technique of mapping the first set of architectural registers to a selectable one of first and second physical register files can be particularly useful in the case when the first set of architectural registers comprise predicate registers for SIMD operations. It may be useful to support modes where SIMD operations are performed with different operand lengths (e.g. vector operations with different vector lengths or matrix operations with different matrix sizes), and so the predicate values for predicating those SIMD operations may also need to scale with operand length being used. However, in processors not supporting distinct processing modes associated with different predicate lengths, the physical predicate register file provided in hardware may have registers of relatively small register length and expanding the predicate register file to accommodate larger predicate register lengths for the second mode may incur a significant area cost. There may already be a larger physical register file available for a different set of architectural registers (e.g. the general purpose scalar registers), and so in the second processing mode it may be more efficient to map the architectural predicate registers to physical registers in the second physical register file, rather than provide longer physical registers in the first physical register file.

The second physical register file may have a different number of physical registers than the first physical register file. More particularly, in some examples the second physical register file may have a greater number of physical registers than the first physical register file.

In cases where the second physical register file has a greater number of physical registers in the first physical register file, a further benefit of using the second physical register file to support the second processing mode rather than expanding the length of each register in the first physical register file can be that in the second processing mode there is less pressure for reclaiming physical registers once no longer needed, as there is a larger pool of registers available for reallocation when necessary.

In some examples, for an operation specifying an identified architectural register of a further set of architectural registers: in response to a determination that the operation is to be processed in the first mode of processing, the register mapping circuitry is configured to map the identified architectural register to a physical register of a third physical register file separate from the first physical register file and the second physical register file. On the other hand, in the second mode of processing, the register mapping circuitry may not be responsible for mapping the identified architectural register to any corresponding physical register. This approach can be useful to support implementations where different execution circuits handle processing operations for at least some operation types in the first and second modes respectively.

For example, in the first mode of processing, operations specifying one of the further set of architectural registers are to be executed by first execution circuitry, but in the second mode of processing, operations specifying one of the further set of architectural registers are executed by second execution circuitry separate from the first execution circuitry using a fourth physical register file separate from the first physical register file, the second physical register file and the third physical register file.

The fourth physical register file may not require any register renaming at all (e.g. if the second execution circuitry executes operations in program order) or the second execution circuitry may be associated with its own dedicated register mapping circuitry for mapping the further set of architectural registers to the fourth physical register file, separate from the register mapping circuitry used to perform register mapping of architectural registers to the first, second and third physical register files. Either way, it is not essential for the register mapping circuitry which handles mapping for the first set of architectural registers to support any register mapping for the further set of architectural registers for operations executed in the second mode of processing.

The further set of architectural registers may be designated as having different register lengths in the first mode and second mode respectively. For example, the further set of architectural registers could be SIMD registers (e.g. vector registers or registers providing matrix operands), for providing operands which can be predicated based on the predicate values associated with the first set of architectural registers.

The first mode of processing and the second mode of processing may be associated with separate first and second items of register length indicating state information. For operations processed in the first mode of processing, the first register length of the first set of architectural registers may depend on the first item of register length indicating state information (and similarly the register length for the further set of architectural registers could also depend on the first item of register length indicating state information). For operations processed in the second mode of processing, the second register length of the first set of architectural registers may depend on the second item of register length indicating state information (and similarly the register length used for the further set of architectural registers in the second mode could also depend on the second item of register length indicating state information). Hence, the modes may be associated with different items of architectural state which control or designate the register length in the two modes. Providing such architectural separation of state indicating the two modes can be useful to enable quick switching between different register lengths, and/or help support micro-architectural implementations which may use different processing hardware to process the same type of operation in the first mode and the second mode respectively (which can be useful to allow more bespoke hardware targeting a longer register length to be provided to accelerate high-throughput operations in the second mode as well as providing simpler hardware which targets a shorter register length in the first mode).

While a mode switch between the first mode and second mode of processing may be associated with a change of register length, it is also possible to vary the register length used within the first mode of processing or to vary the register length used within the second mode of processing. For example, the first/second items of register length indicating state information mentioned above could be programmable to set the effective register length in the first/second mode of processing respectively, which may influence which portions of physical registers are used to provide operands or written with results in the first/second modes respectively.

The mode change detection could detect the mode change between the first and second modes in different ways. For example, the mode change detection circuitry may detect the mode change in response to at least one of: processing of a mode change instruction; and a change to mode indicating state information stored in a control register. The mode change instruction could be an instruction with a dedicated opcode identifying an instruction for changing between the first and second modes, or could be a system register updating instruction which specifies that an update to the mode indicating state stored in a control register is required. The opcode of such a system register updating instruction may be the same as the opcode for system register updating instructions used for other kinds of system register state updates. A further parameter of the instruction (e.g. specified as an immediate value in the instruction encoding or as a value in a register referenced by the instruction) may specify which item of system register state is actually to be updated. With this approach the generic system register updating instruction functions as the mode change instruction when the further parameter is encoded to identify that the mode indicating state information is to be updated. Either way, the mode change can be triggered by the processing of an instruction included by the software developer or compiler in an executed program at the point of program flow where processing is to switch between modes.

The register mapping circuitry may trigger a register resetting operation in response to the mode change to ensure that, for a given operation processed following the mode change which specifies a particular architectural register of the first set of architectural registers for providing a source operand without any intervening operation having written to the particular architectural register between the mode change and the given operation, the source operand is treated as having a predetermined value. For example, the predetermined value can be zero, or a predetermined non-zero value. The register resetting operation can be helpful to provide a consistent starting point for the architectural state associated with the first set of architectural registers just after a mode switch, so that it is not necessary to transfer values associated with the first set of architectural registers between the first and second physical register files when switching processing modes (and similarly the further set of architectural registers mentioned earlier may also be cleared, to prevent the need to transfer data between the third and fourth physical register files on a mode switch). This can provide a more efficient processor implementation. The ISA may specify that software programmers cannot rely on values from the first set of architectural registers (or further set of architectural registers) still being available following the change of mode, and so software should assume that if one of the first (or further) set of architectural registers is read after a mode change without any intervening operation having written to that particular architectural register since the mode change, the register read will return the predetermined value irrespective of the previous state associated with that architectural register before the mode change.

The register mapping circuitry may dispatch, to a subsequent pipeline stage, the operation specifying the given architectural register of the first set of architectural registers associated with a register file selection indication indicative of whether the physical register mapped to the given architectural register is a physical register of the first physical register file or the second physical register file. The register file selection indication allows later pipeline stages to determine which physical register file should be accessed to obtain operands for that operation or which physical register file should be written with processing results for that operation.

Register reclaim circuitry may be provided to determine, following an operation specifying one of the first set of architectural registers being committed or flushed, whether at least one physical register to be freed for reallocation is to be freed from the first physical register file or the second physical register file. A given physical register identifier could correspond to a register in either the first physical register file or the second physical register file, so the register reclaim circuitry may support a mechanism to track whether, for a given operation, the physical register corresponding to one of the first set of architectural registers was allocated in the first physical register file or the second physical register file.

For example, a register commit queue may be provided which comprises register mapping entries representing a queue of register mappings associated with respective points of program flow. The register reclaim circuitry may identify a given physical register to be freed for reallocation based on a committed or flushed register mapping entry of the register commit queue. For a committed register mapping entry (an entry that can be removed from or overwritten in the register commit queue once the corresponding operation has been committed when it is known the operation was correctly processed and will not need to be flushed), the register reclaim circuitry identifies the given physical register based on a physical register indication specified in a corresponding rename table entry corresponding to an architectural register specified by the committed register mapping entry. For a flushed register mapping entry (an entry that can be removed from or overwritten in the register commit queue following a determination that the corresponding operation was incorrectly processed, e.g. due to a misprediction or other error), the register reclaim circuitry identifies the given physical register based on a physical register indication specified in the flushed register mapping entry itself.

Determination of whether the given physical register is to be freed in the first physical register file or the second physical register file can be done in a number of different ways.

In one example, in response to detecting the mode change, the mode change detection circuitry may allocate to the register commit queue a mode change indicating entry indicative of the mode change. The register reclaim circuitry may detect, based on the mode change indicating entry, a transition between a first set of register mapping entries corresponding to operations processed in the first mode (for which on commitment or flushing of those register mapping entries, a physical register is freed from the first physical register file) and a second set of register mapping entries corresponding to operations processed in the second mode (for which on commitment or flushing of those register mapping entries, a physical register is freed from the second physical register file). For example, the register reclaim circuitry may maintain a "current mode" indication and may flip the state of the current mode indication in response to detecting the mode change indicating entry. When a physical register is to be freed which was mapped to one of the first set of architectural registers, the current mode indication could be used to determine whether to free the register in the first physical register file or the second physical register file. This approach can help to conserve circuit area by avoiding a need to tag register mapping entries and rename table entries associated with mappings for the first set of architectural registers with an indication of which physical register file was selected for that mapping.

Another approach can be that register mapping tracking structures such as the register commit queue and the rename table can have entries tagged with a register file selection indication to indicate which physical register file was used for a physical register allocated for one of the first set of architectural registers. Hence, the register reclaim circuitry may detect, based on a register file selection indication specified by the flushed register mapping entry or a register file selection indication specified by a corresponding rename table entry corresponding to an architectural register specified by the committed register mapping entry, whether a physical register indicated by the flushed register mapping entry or the corresponding rename table entry as mapped to one of the first set of architectural registers should be freed from the first physical register file or the second physical register file.

Specific examples will now be described with reference to the drawings.

FIG. 1 schematically illustrates an example of an apparatus 2 having mode change detection circuitry 4 and register mapping circuitry 6. The mode change detection circuitry 4 detects a mode change when processing circuitry (not shown in FIG. 1) switches between a first mode of processing and a second mode of processing. The first and second modes of processing are associated with different register lengths for a first set of architectural registers (e.g. the second mode may have a greater register length than the first mode). The mode change can be detected based on the execution of a mode change instruction by the processing circuitry, or based on a change in mode indicating state information which indicates the current mode. The register mapping circuitry 6 is responsible for mapping architectural registers specified by operations (ops) to be processed by the processing circuitry to physical registers implemented in hardware. The register mapping circuitry 6 can also be referred to as register rename circuitry. The register mapping circuitry 6 maintains a mapping table 8 tracking mappings from architectural registers to physical registers. As explained further below, for a first set of architectural registers (in the specific example below, a predicate register set), the register mapping circuitry 6 selects, based on whether an operation requiring the register mapping is processed in the first mode or the second mode, whether to map one of the first set of architectural registers specified by that operation to a physical register in a first physical register file 10 or a second physical register file 12.

Figure 2:
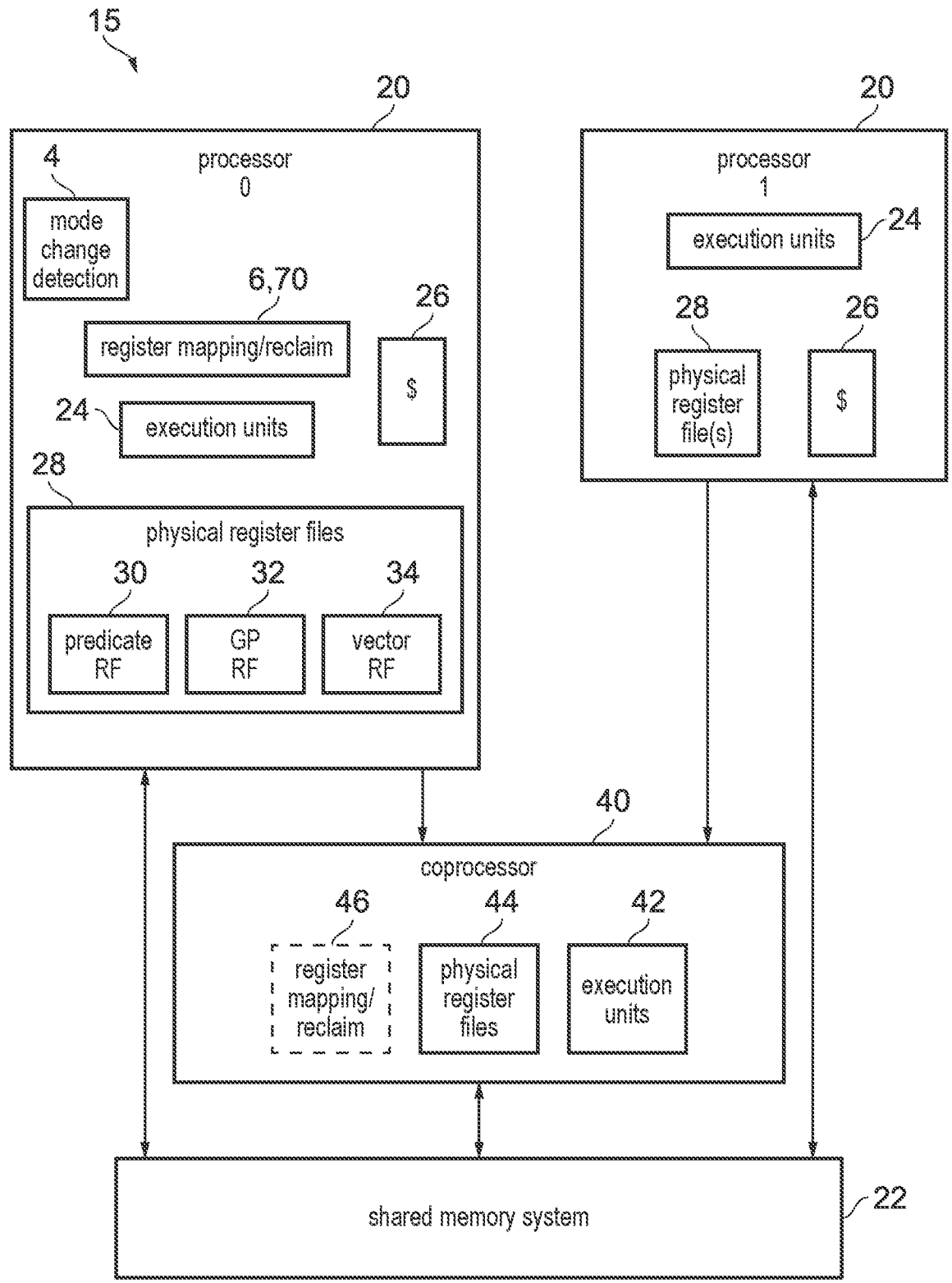
FIG. 2 illustrates a processing apparatus.

FIG. 2 illustrates a more detailed example of a data processing apparatus 15 which can use the register mapping technique discussed here. The apparatus 15 has one or more processors 20 which share access to a shared memory system 22. FIG. 2 shows an example with two such processors 20, but it will be appreciated that there could be a different number of processors. The processors could be homogenous or heterogeneous—in the case of a heterogeneous multi-processing system, different processors may have different micro-architectural features. For example, each processor could be a CPU (Central processing unit), GPU (graphics processing unit), NPU (Neural processing unit-α processor specializing in operations for neural networks or other machine learning workloads), or other type of processor. Each processor may have one or more execution units 24 (an example of processing circuitry) for executing different kinds of processing operations, one or more physical register files 28 providing hardware registers for storing operands for, and results of, processing operations executed by the execution units 24, and one or more caches for caching data or instructions obtained from the memory system 22.

As shown in FIG. 2, at least one of the processors 20 has the mode change detection circuitry 4 and register mapping circuitry 6 described in FIG. 1, and also has register reclaim circuitry 70 (which will be described in more detail later). The processor 20 has, for its physical register files, a number of separate physically distinct physical register files 30, 32, 34, each comprising a certain number of hardware registers of a given physical register length (different register files may have different numbers of registers, and registers of different register length). For example, FIG. 2 shows an example where a processor 20 has a predicate register file (first physical register file) 30 for storing predicate values for predicating vector operations or other SIMD operations, a general purpose register file (second physical register file) 32 for storing scalar operands and results, and a vector register file (third physical register file) 34 for storing vector/SIMD operands and vector/SIMD results for vector operations or other SIMD operations. The vector/SIMD operands and results comprise multiple independent data elements each representing an independent numeric value separate from other data elements of the operand/result. While in FIG. 2 only one of the processors has the mode change detection circuitry 4, register mapping/reclaim circuitry 6, 70 and first, second and third physical register files 30, 32, 34 shown in FIG. 2, in other examples two or more of the processors may have these features.

The apparatus 15 also includes a coprocessor 40 which can be shared between processors 20 (or be dedicated for use by a specific processor 20) and has its own set of execution units 42 which are dedicated to performing a certain class of processing operations. The coprocessor 40 has its own physical register files 44 and may (optionally) have its own register mapping/reclaim circuitry 46, separate from the register mapping circuitry 6 provided in a given processor 20. By allowing a particular class of processing operations (e.g. vector, matrix or other SIMD processing operations) to be offloaded to the coprocessor 40 (when processing in a particular processing mode, e.g. the second mode of processing described earlier), this can free up bandwidth on the processor 20 for other operations, allow a more bespoke set of hardware to be used (which can support functions not available in the execution units 24 of the processor 20 and/or can more efficiently process that class operations compared to general purpose hardware in the processor 20 itself), and/or allow that bespoke hardware to be shared between processors 20 avoiding the need for duplicating that hardware at each individual processor 20.

Figure 3:
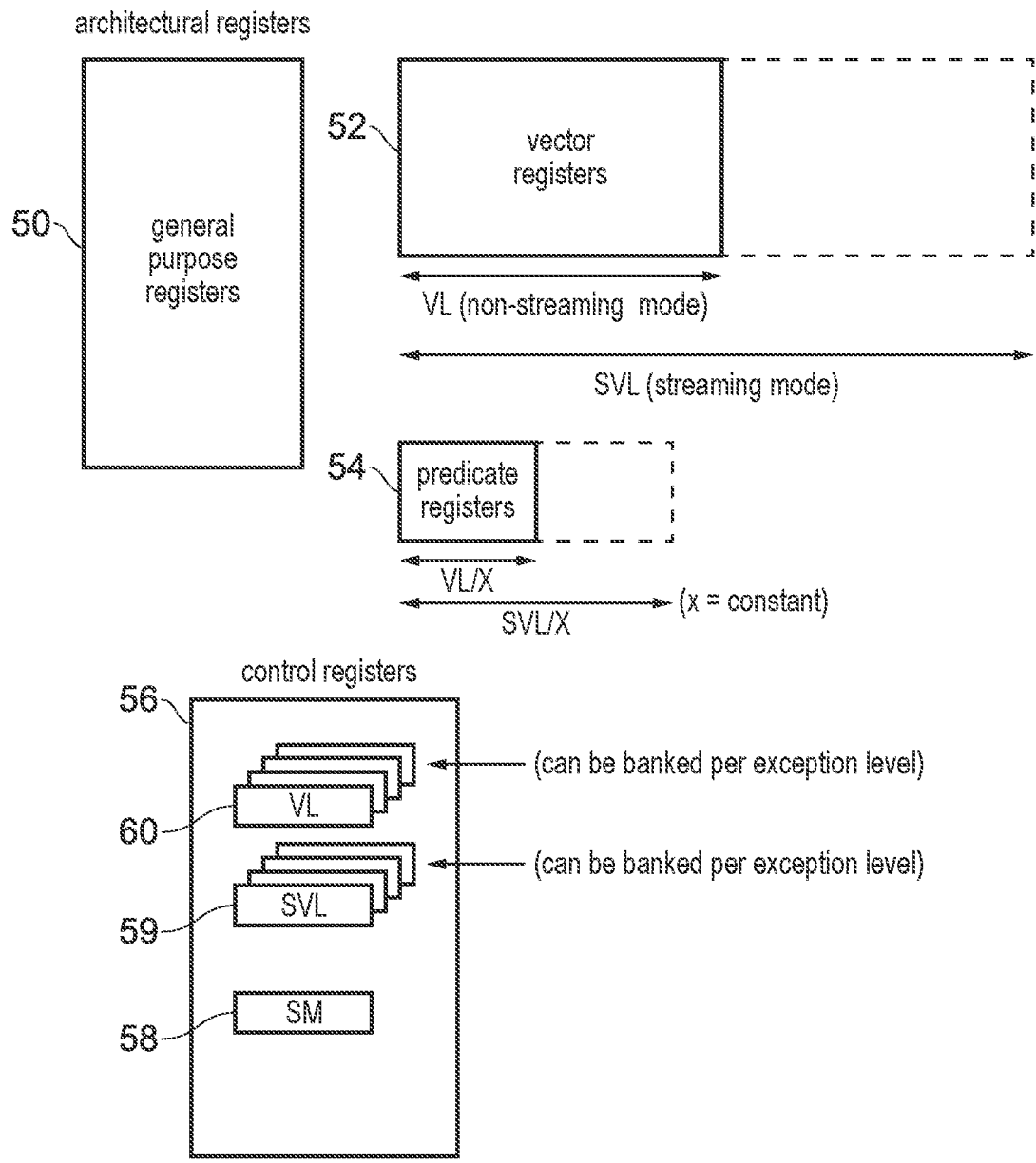
FIG. 3 illustrates sets of architectural registers.

FIG. 3 illustrates sets of architectural registers available for referencing by instructions encoded according to the instruction set architecture (ISA) supported by the processing system 15. FIG. 3 does not show the physical register files provided in hardware for implementing these architectural registers, but merely shows which registers are logically available for referencing by instructions. In this example, the ISA supports:

a general purpose register set 50 (second set of architectural registers), comprising general purpose registers for specifying scalar operands for scalar processing operations;

a vector register set 52 (third set of architectural registers), comprising vector registers for specifying vector operands for vector processing operations, matrix operations or other SIMD operations;

a predicate register set 54 (first set of architectural registers), comprising predicate registers for specifying predicate values for predicating vector, matrix or other SIMD operations; and a set of control registers 56 for storing control values for controlling operation of the processor 20. Information stored in the control registers may be set automatically in response to certain events, or can be programmable based on execution of a system register updating instruction.

The ISA supported by the processing apparatus 15 is a scalable vector ISA (also known as a "vector length agnostic" vector ISA) supporting vector instructions operating on vectors of scalable vector length to enable the same instruction sequence to be executed on apparatuses with hardware supporting different maximum vector lengths. This allows different hardware designers of processor implementations to choose different maximum vector lengths depending on whether their design priority is high-performance or reduced circuit area and power consumption, while software developers need not tailor their software to a particular hardware platform as the software written according to the scalable vector ISA can be executed across any hardware platform supporting the scalable vector ISA, regardless of the particular maximum vector length supported by a particular hardware platform. Hence, the vector length to be used for a particular vector instruction of the scalable vector ISA (and hence also the predicate length of the corresponding predicate registers 54) is unknown at compile time (neither defined to be fixed in the ISA itself, nor specified by a parameter of the software itself). The operations performed in response to a given vector instruction of the scalable vector ISA may differ depending on the vector length chosen for a particular hardware implementation (e.g. hardware supporting a greater maximum vector length may process a greater number of vector elements for a given vector instruction than hardware supporting a smaller maximum vector length). An implementation with a shorter vector length may therefore require a greater number of loop iterations to carry out a particular function than an implementation with a longer vector length.

The vector length agnostic property of the scalable vector ISA is useful because within a fixed encoding space available for encoding instructions of the ISA, it is not feasible to create different instructions for every different vector length that may be demanded by processor designers, when considering the wide range of requirements scaling from relatively small energy-efficient microcontrollers to servers and other high-performance-computing systems. By not having a fixed vector length known at compile time, multiple markets can be addressed using the same ISA, without effort from software developers in tailoring code to each performance/power/area point.

To achieve the scalable property of the scalable vector ISA, the functionality of the vector instructions of the scalable vector ISA is defined in the architecture with reference to a parameter (e.g. VL 60 or SVL 59 as shown in FIG. 3, described in more detail below) which indicates the vector length in use (when considering the maximum vector length supported in hardware and any software-defined limitations using the control registers 56), where that parameter VL or SVL is unknown at compile time. Hence, execution of the same vector instruction on different systems may produce different results (typically varying in terms of the number of vector elements generated, a subset of which may have the same result values on different platforms, but in general platforms implementing a greater vector length may generate additional vector elements in comparison with a platform implementing a smaller vector length). Predicate values defined in the predicate registers 54 may be used to control which elements are generated in a given instance of an instruction and can be set based on vector length agnostic principles such as by using comparison instructions to automatically generate the values of predicate for a particular loop iteration or applying some generally-defined predicate pattern which can scale to different vector lengths. Certain instructions may update loop control parameters such as an element count value to track how many vector elements have been processed so far so that across all iterations of a loop as a whole both the implementations with wider and narrow vector lengths may eventually achieve the same results but with different levels of performance, since the implementation with a wider vector length may require fewer loop iterations than an implementation with a narrower vector length.

This particular ISA also supports two different modes for executing vector operations: a non-streaming mode of operation (first mode of operation) and a streaming mode of operation (second mode of operation). Mode indicating state information 58 stored in the control registers 56 indicates whether the current mode is the non-streaming mode or streaming mode, and can be set in response to execution of a mode changing instruction. Scalar operations using the general purpose registers 50 may be processed in the same way regardless of whether the current mode is the non-streaming mode or the streaming mode, but operations using the vector registers 52 and predicate registers 54 may be processed differently depending on whether the current mode is the streaming mode or the non-streaming mode.

In the non-streaming mode, vector registers 52 are architecturally designated as having a vector register length VL identified by a non-streaming vector length specifying value 60 specified in the control registers 56, and the predicate registers 54 are architecturally designated as having a register length VL/X, where X is a constant corresponding to a minimum vector element size supported (e.g. X may equal 8 for an implementation where the smallest vector element size is 8 bits). In the streaming mode, vector registers 52 are architecturally designated as having a streaming mode vector length SVL identified by a streaming vector length specifying value 59 specified in the control registers 56, and the predicate registers 54 are architecturally designated as having a register length SVL/X. Hence, both the vector registers 52 and predicate registers 54 may logically be seen as changing register length when there is a change of mode between the streaming mode and the non-streaming mode.

Both the non-streaming vector length specifying value 60 and streaming mode vector length specifying value 59 may be implemented in different ways. In some examples, these vector length specifying values 60, 59 could simply be a hardwired piece of state information which is not programmable by software, and simply indicates the maximum register length supported each mode by the hardware. This can then be read by software to identify the particular vector length implemented on the hardware executing the program, so that the same software can execute with different vector lengths on different hardware.

In other examples, the ISA may support more privileged software being able to limit the maximum vector length which is usable by software executing in a less privileged state. For example, to save power a given piece of software could be limited so that it cannot make use of the full vector length supported in hardware. Hence, the vector length specifying values 60, 59 could include information settable by software, to specify the vector length to be used in each mode 60, 59. Nevertheless, even if the more privileged software applies a limit on vector length, the vector length for the application software is still unknown at compile time because it will not be known whether the actual implemented vector length in a particular processor will be greater or less than the limit defined in the length specifying value 60, 59. For implementations with hardware supporting a smaller maximum vector length than the limit defined in the length specifying value 60, 59, a smaller vector length than indicated by the limit will actually be used. For example, the effective vector length seen by software may correspond to the minimum of the maximum vector length supported in hardware for the current mode and the vector length limit set by software. The vector length specifying values 60, 59 may be banked per exception level so that different limits on maximum vector length supported may be specified for software executing in different exception levels (e.g. software at one exception level may be allowed to use a longer vector length than software at another exception level).

Hence, there can be a variety of ways in which control state information stored in the control registers 56 may influence the vector length useful vector operations, but in general some state information is available which can enable software to determine the effective vector length used for each mode.

It can be useful to support both the non-streaming modes and streaming modes, as this can provide greater flexibility for hardware microarchitecture designers to introduce a coprocessor 40 as shown in FIG. 2, as the architecturally defined mode of processing and separate vector length indicating values 60, 59 for the respective modes makes it simpler for the hardware to determine when instructions requiring vector registers should be offloaded to the coprocessor 40 or executed within the local execution units 24 of a given processor 20. It also allows software to explicitly designate whether a particular workload would be more suited for execution on the general purpose execution units 24 of the processor 20 or on the more bespoke hardware of the coprocessor 40. This can be useful because for vector processing routines requiring smaller vectors and/or workloads where vector operations are interspersed with scalar operations, it may be more appropriate for the vector operations to be processed on the general purpose execution units 24 local to the processor 20 itself, while the coprocessor 40 may be more suited to processing "streaming" workloads which require high throughput of vector operations on large datasets with relatively little need for intervening scalar operations (e.g. workloads associated with machine learning applications such as neural network processing). To simplify micro-architecture implementation, a register resetting operation may be performed to ensure that reads of the vector registers 52 and predicate registers 54 following a mode change between streaming/non-streaming modes return a predetermined value (e.g. zero) if they occur after the mode change without any intervening write to that register since the mode change. This avoids the need to transfer data between registers in the processor 20 and registers in the coprocessor 40 on the mode change, as the ISA specifies that software should assume that the architectural state in the vector registers 52 and predicate registers 54 are cleared on a mode change.

For such streaming workloads, longer vector lengths may be useful to reduce the instruction fetch/decode overhead associated with processing a given number of vector elements. Hence, although the ISA does not require it (the vector length for non-streaming mode may be selected from among a certain set of vector lengths supported, and the streaming mode vector length may be selected from among a second set of vector lengths supported, with no fixed relation between the length selected for non-streaming mode and streaming mode), in implementations which choose to provide a coprocessor 40 for supporting the streaming vector mode, it is relatively likely that the streaming mode vector length may be greater than the non-streaming mode vector length, in some cases many times greater. As just one example (other lengths can also be used), an implementation might choose to implement a maximum vector length of 128 bits in the non-streaming mode and 512 bits in the streaming mode, with the predicate registers therefore having an architectural vector length of 16 bits in the non-streaming mode and 64 bits in the streaming mode. When a coprocessor is provided, vector instructions executing the streaming mode would be expected to run on the coprocessor 40 which may have, within its physical register files 44, physical registers of sufficient size to handle the maximum streaming mode vector length. Therefore, there may be no need for the vector physical register file 34 in the processor 20 to expand beyond the maximum vector length supported for the non-streaming mode.

However, for the predicate register set 54, predicate computation operations may still need to be performed within the execution units 24 of the processor 20, even when the current mode is the streaming mode. Allowing the processor 20 to compute predicates for the streaming mode can sometimes be more efficient than using the coprocessor for predicate computations, because the predicate computation instructions may rely on scalar operands produced by scalar instructions executed on the execution units 24 of the processor 20. Therefore, one might expect that supporting the streaming mode may require the physical predicate register file 30 to be expanded in size so that each physical register in the predicate register file 30 is sized according to the maximum streaming mode vector length supported for the streaming mode. However, this may require a significant amount of extra register storage circuitry compared to a processor which does not support the streaming mode.

In the examples discussed below, the need to expand the size of each physical predicate register in the predicate register file 30 is avoided by instead mapping the architectural predicate registers 54 to one of the other physical register files 32, 34 for operations processed in the streaming mode. This recognises that the general purpose scalar register file 32 and/or the vector register file 34 may already have registers of sufficient size to store the predicate values corresponding to predicate registers 54 of length SVL/X in the streaming mode, so the register mapping circuitry 6 in the processor 20 can map the architectural predicate registers to one of these other register files 32, 34 when the current mode is the streaming mode. In the examples below, the general purpose register file 32 is selected for mapping the architectural predicate registers 54 during the streaming mode, but in other examples the architectural predicate registers 54 could be mapped to physical registers from the vector register file 34 for operations processed in the streaming mode. Another advantage of using the general purpose register file 32 or vector register file 34 for the predicate operations in the streaming mode is that these register files may have a greater number of physical registers than the predicate register file, so there is a larger pool of registers available for allocation to the predicate registers. This can be useful when operations are being offloaded to the coprocessor 40 because the physical separation between the processor 20 and coprocessor 40 may mean that there may be a longer delay between predicate values being computed at the processor 20 and those values no longer being required so that the physical registers corresponding to those predicates can be reclaimed for reallocation to other architectural registers. By using a register file with a larger pool of physical registers for the predicates in the streaming mode, there is reduced pressure on reclaim of registers for reallocation, so that it is less likely that delays in reclaiming physical registers causes a stall in processing because there are not enough physical registers available to allocate to another architectural register. Hence, mapping the architectural predicate registers to the general purpose register file 32 or vector register file 34 in the streaming mode can also help to improve performance.

Figure 4A:
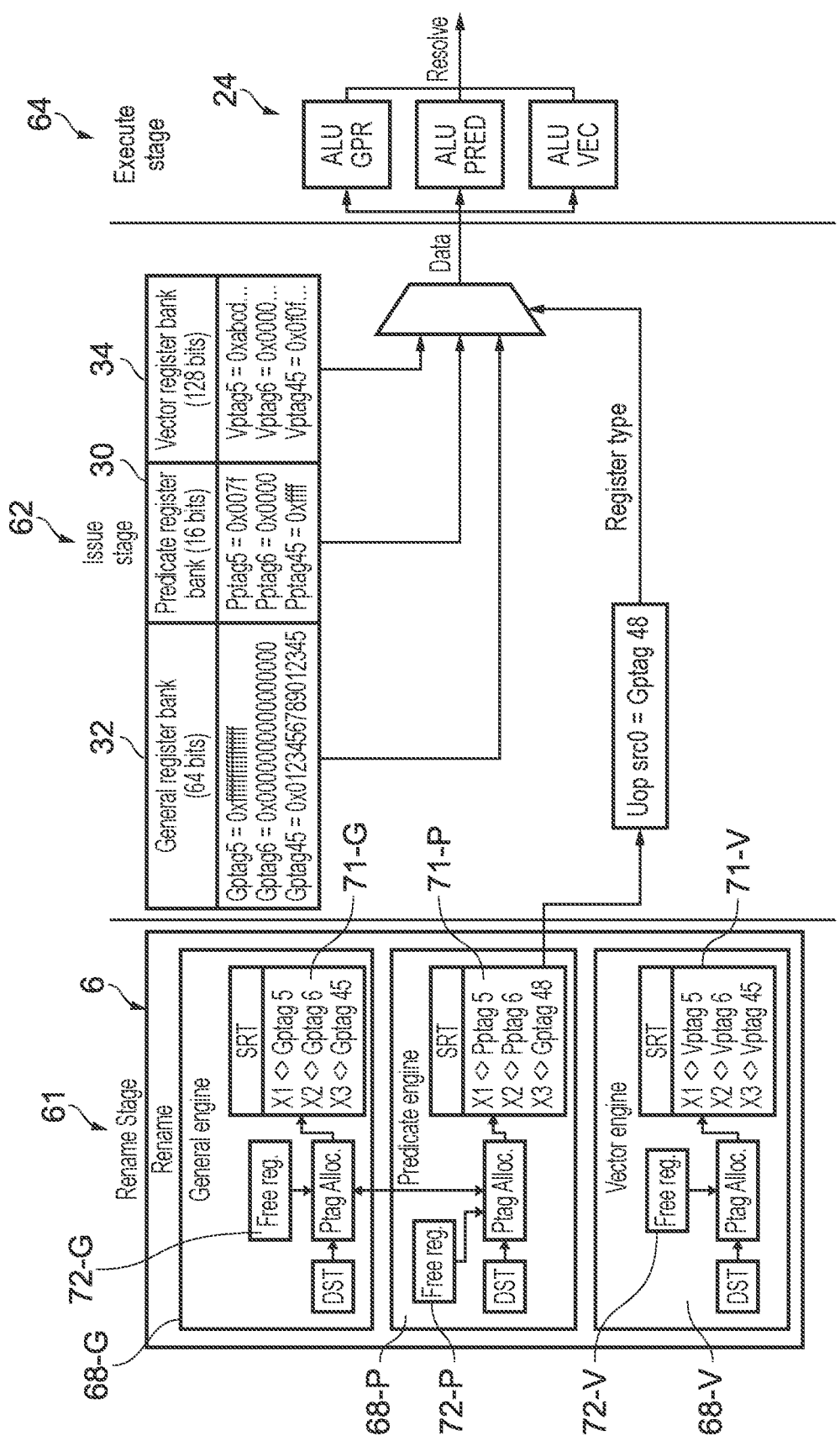
FIGS. 4A and 4B illustrate an example of stages of a processing pipeline supporting mapping of a first set of architectural registers to a first physical register file for operations processed in a first mode and to a second physical register file for operations processed in a second mode.
Figure 4B:
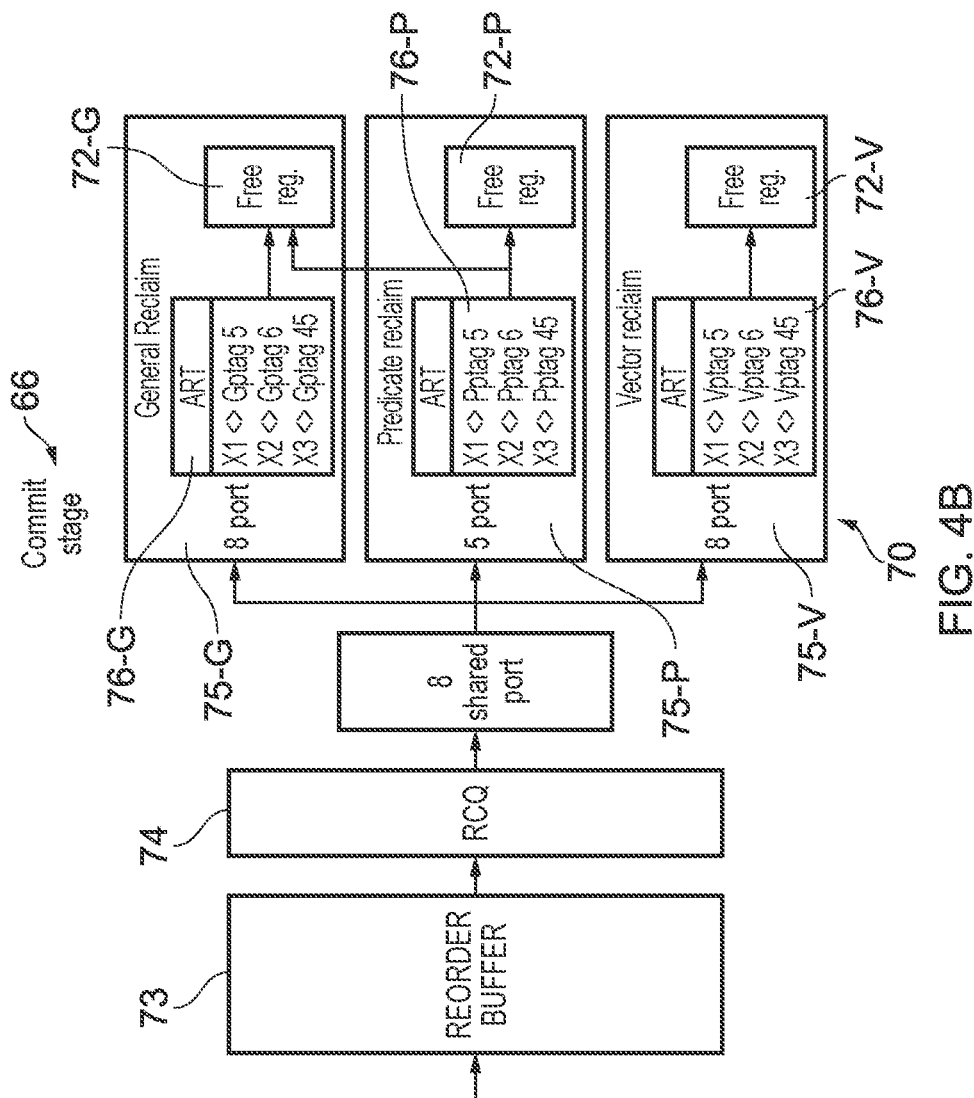

FIGS. 4A and 4B schematically illustrate a more detailed example of a portion of a processing pipeline included in the processor 20, the processing pipeline comprising register mapping circuitry 6 and register reclaim circuitry 70 supporting the ability to variably map the architectural predicate registers 54 to either a physical predicate register file 30 or physical general purpose register file 32, depending on the mode in which an operation specifying one of those predicate registers 54 is processed. FIGS. 4A and 4B illustrate a rename stage 61, issue stage 62, execute stage 64 and commit stage 66 of the processing pipeline. It will be appreciated that these are not all the stages the pipeline, and other stages may also be provided. For example, the pipeline may also include a fetch stage and decode stage prior to the rename stage 61, the fetch stage for fetching instructions from an instruction cache or memory and the decode stage for decoding the instructions to generate decoded instructions representing the operations to be processed by remaining stages of the pipeline.

At the rename stage 61 shown in FIG. 4A, architectural registers specified by decoded instructions are mapped to physical register identifiers (tags) identifying physical registers within one of the physical register banks 30, 32, 34 provided in hardware. The rename stage 61 comprises the register mapping circuitry 6 which is responsible for providing register mappings for the architectural predicate registers 54, the architectural general purpose registers 50, and in the non-streaming mode (first mode of processing), the architectural vector registers 52. In the streaming mode, the register mapping circuitry 6 within the rename stage 61 of the processing pipeline in processor 20 is not responsible for providing any register mappings for the architectural vector registers 52, because in the streaming mode the coprocessor 40 is responsible for execution of vector operations using the architectural vector registers, and the coprocessor 40 may either have its own register mapping circuitry 46 for providing architectural-to-physical register mappings for the vector registers in the streaming mode, or the coprocessor 40 may not have any register mapping circuitry at all and may execute operations in order with a fixed one-to-one mapping between the architectural vector registers 52 and physical registers in the physical register files 44 of the coprocessor 40.

The register mapping circuitry 6 includes general purpose rename circuitry 68-G, predicate rename circuitry 68-P and vector rename circuitry 68-V for providing register renaming functions for the architectural general purpose registers 50, architectural predicate registers 54 and architectural vector registers 52 respectively. The general purpose rename circuitry 68-G, predicate rename circuitry 68-P and vector rename circuitry 68-V are generically referred to as rename circuitry 68 below, when a feature common to the three instances of rename circuitry 68-G, 68-P, 68-V is described.

Each rename circuitry 68 controls register mapping based on a corresponding speculative rename table (SRT) 71-G, 71-P, 71-V (generically referred to as SRT 71 when a feature common to the three instances is referenced) and a corresponding free register list 72-G, 72-P, 72-V (generically referred to as free register list 72 when a feature common to the three instances is referenced). The SRT 71 is a table indicating the latest mappings between architectural registers 50, 52, 54 and corresponding physical registers assigned by the rename stage 6, including mappings assigned to speculatively processed instructions which have not yet had their outcome resolved. There are separate SRTs 71-G, 71-P, 71-V for indicating mappings for the general purpose registers 50, predicate registers 54 and vector registers respectively. The SRT 71 differs from an architectural rename table (ART) 75-G, 75-P, 75-V maintained for each set of architectural registers 50, 54, 52 at the commit stage 66 which tracks committed architectural-to-physical register mappings which represent the architectural state at the commit point representing the point of program flow up to which processing is known to be correct (and not yet including any mappings allocated in the SRT 71 for speculatively processed operations which have not yet been resolved). The free register list 72-G, 72-P, 72-V identifies which of the physical registers in the corresponding physical register bank 32, 30, 34 are available for allocation to a different architectural register. Maintenance of the free register list 72 is controlled by the register mapping circuitry 6 at the rename stage 61 (when new physical registers are allocated) and by reclaim circuitry 70 at the commit stage 66 (when operations are committed or flushed from the pipeline).

When a decoded instruction representing an operation to be performed is received at the rename stage 61, the register mapping circuitry 6 determines which types of architectural registers are required by the decoded instruction. If the decoded instruction requires one or more architectural general purpose registers 50, the corresponding architectural general purpose register identifiers are provided to the general rename circuitry 68-G. If the decoded instruction requires one or more architectural predicate registers 54, the corresponding architectural predicate register identifiers are provided to the predicate rename circuitry 68-P. If the decoded instruction requires one or more architectural vector registers 52 and the current mode is the non-streaming mode, the corresponding architectural vector register identifiers are provided to the vector rename circuitry 68-V. It is possible for the same decoded instruction to require registers in more than one of the sets of architectural registers 50, 52, 54, so the same instruction may trigger processing by more than one of the rename circuit engines 68-G, 68-P, 68-V.

When a given instance of rename circuitry 68 associated with one of the architectural register sets 50, 52, 54 receives a corresponding architectural register identifier, the mapping performed by the given rename circuitry 68 depends on whether that architectural register identifier is provided for a source register (which provides a source operand for an operation to be processed) or a destination register (which is a register to which the result of an operation is to be written). It is possible for the same architectural register to function as both source register and a destination register for the same decoded instruction.

For a given architectural register used as a source register, the rename circuitry 68 looks up the current register mapping entry for that architectural register specified in the SRT 71, and outputs a physical register tag specified in that entry of the SRT. The physical register tag is an identifier of the physical register from which the source operand is to be obtained for the corresponding processing operation, and is passed to the next pipeline stage along with a representation of the operation to be performed.

Figure 5:
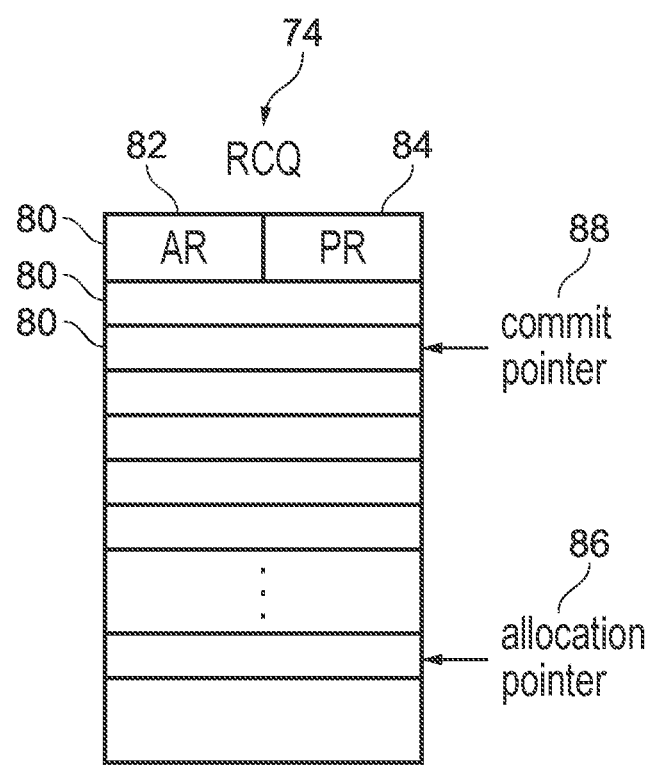
FIG. 5 illustrates an example of a register commit queue for tracking register mappings.

For a given architectural register used as the destination register, the rename circuitry 68 selects a free physical register indicated as available for allocation in the free register list 72, updates the SRT 71 to specify that selected physical register as the mapped physical register in the entry corresponding to the given architectural register, and outputs the physical register tag identifying the newly allocated physical register to the next pipeline stage to indicate the physical register to which the result of the corresponding processing operation is to be written. Also, the rename circuitry 68 updates the free register list to indicate that the selected physical register is no longer available for allocation. Also, the rename circuitry 68 allocates to a register commit queue (RCQ) 74 an entry indicating the new mapping from the given architectural register to the selected physical register. FIG. 5 illustrates an example of the RCQ 74 in more detail. The RCQ 74 is managed as a circular buffer comprising a number of RCQ entries 80 each specifying at least an architectural register identifier 82 of an architectural register and a physical register identifier 84 identifying a corresponding physical register mapped to that architectural register by the rename circuitry 68. An allocation pointer 86 is used by the rename circuitry 68 to identify the position in the buffer at which the next RCQ entry should be inserted when a new register mapping is allocated by the rename circuitry 68. A commit pointer 88 is used by the reclaim circuitry 70 to identify the position in the buffer corresponding to the next RCQ entry to be committed when a corresponding operation is committed. The allocation pointer 86 is advanced to the next entry each time a new entry is inserted to the buffer (and wraps round from the end of the buffer to the start of the buffer when the end of the buffer has been reached). Similarly, the commit pointer is advanced each time an entry is committed (and wraps round from the end of the buffer to the start of the buffer when necessary). As discussed in more detail below, the entries of the RCQ 74 represent, in program order, the sequence of register mappings allocated by the register mapping circuitry 6, and are used by the reclaim circuitry 75 to determine which physical registers can be freed for reallocation when speculative operations are flushed or committed.

Returning to the discussion of FIGS. 4A and 4B, for the general purpose rename circuitry 68-G, the register mappings are controlled with reference to the SRT 71-G and free register list 72-G, to map the architectural general purpose registers 50 to physical registers in the general register bank 32. Similarly, the vector rename circuitry 68-V maps, with reference to the SRT 71-V and free register list 72-V, the architectural vector registers 52 to physical registers in the vector register bank 34 (in the streaming mode (second mode), it is not expected that the rename circuitry 68 within the processor 20 would receive any such requests to map architectural vector registers, as the coprocessor 40 would be handling execution of vector instructions).

However, the predicate rename circuitry 68-P varies which free register list 72 is referenced when selecting physical registers to be mapped to architectural predicate registers, depending on whether the corresponding operation is to be processed in the non-streaming mode (first mode) or streaming mode (second mode). For an operation to be processed in the non-streaming mode, any predicate registers referenced by the operation are mapped to the predicate register bank 30, and the predicate free register list 72-P is used (and maintained following new allocations) to track which physical registers of the predicate register bank 30 are available for allocation. For an operation to be processed in the streaming mode, any predicate registers are mapped to the general purpose register bank 32, and the general purpose free register list 72-G is used (and maintained following new allocations) to track which physical registers of the general purpose register bank 30 are available for allocation. Hence, a communication path may be provided between the predicate rename circuitry 68-P and the general purpose rename circuitry 68-G to allow both predicate rename circuitry 68-P and general purpose rename circuitry 68-G to reference the general purpose free register list 72-G.

The issue stage 62 issues operations for execution by the execute stage 64 when their operands are ready. The issue stage 62 is also responsible for reading the required operands from the respective physical register banks 30, 32, 34. Hence, the physical register identifier(s) provided by the rename stage 61 for each register referenced by a decoded operation are used to identify which register of the corresponding register bank 30, 32, 34 is to be accessed to provide the operand. For some operations, it may be implicit which register bank is to be accessed. However, for other operations a register file indicator may be passed to the issue stage 62 by the rename stage 61 to identify the register file to be accessed for that instruction. In particular, for operations requiring predicate registers, the register file indicator may be set by the rename stage 61 to indicate whether the predicate registers are to be accessed within the predicate register bank 30 or the general purpose register bank 32.

Once the required operands are available, the operation is issued to the execute stage 64, which executes the processing operation using one of the execution units 24 and writes the results to the corresponding physical register allocated to the destination register for the operation.

The reorder buffer 73 is used by the commit stage 66 to track out of order execution and commitment of processing operations. The reorder buffer 73 has a number of entries, each corresponding to a given operation to be processed and specifying whether that operation has been executed yet. Entries are allocated to the reorder buffer 73 as the operations to be processed are generated by a front-end stage of the pipeline (e.g. a decode stage or the rename stage 61). The entries are arranged corresponding to the order in which the operations would logically appear if instructions of a corresponding program were executed in the original program order. However, the execute stage 64 is able to execute the operations out-of-order, in order different from the program order, so that a younger operation whose operands are already available may bypass an older operation which is still waiting for operands, where the younger operation is independent of the older operation. Hence, when a given operation is executed, the corresponding entry in the reorder buffer 73 is updated to indicate that the operation has been executed. A given operation tracked by the reorder buffer 73 can be committed when it has been executed by the execute stage 64 and there are no older operations still awaiting commitment. For example, a reorder buffer commit pointer may track the reorder buffer entry corresponding to the oldest remaining uncommitted operation which has not yet been executed. Once that operation is executed, the reorder buffer commit pointer may be advanced to the next oldest unexecuted entry and the operations corresponding to the entry previously pointed to by the reorder buffer commit pointer (and any intervening entries between that entry and the latest entry pointed to by the reorder buffer commit pointer) may be committed, causing register reclaim operations to be performed by the reclaim circuitry 70 based on corresponding entries of the RCQ 74.

In some cases, a reorder buffer entry 73 may be shared between a number of separate micro-operations executed by the execute stage 64 (e.g. micro-operations handled by different execution units which correspond to the same program instruction), and if so then the entry is committed once all of those micro-operations have executed (the reorder buffer entry 73 may track how many of the micro-operations have executed, to allow a determination of when the entry can be considered committed).

When a given entry of the reorder buffer 73 is committed, that entry specifies how many corresponding RCQ entries 80 were allocated to the RCQ 74 by the register mapping circuitry 6 when performing register renaming for the corresponding operation. The number of RCQ entries 80 for the committed operation may correspond to the number of destination registers associated with that operation. Hence, the reclaim circuitry 70 reads out the specified number of RCQ entries 80 from the RCQ 74 (from locations in the RCQ 74 determined relative to the RCQ commit pointer 88), and advances the RCQ commit pointer 88 corresponding to the read out number of RCQ entries, so that the RCQ commit pointer 88 now points to the next uncommitted RCQ entry.

The register reclaim circuitry 70 has reclaim circuits 75-G, 75-P, 75-V (generically referred to as reclaim circuit 75) for reclaiming registers from the general purpose physical register file 32, predicate physical register file 30 and vector physical register file 34 respectively. Each reclaim circuit 75 maintains a corresponding architectural rename table (ART) 76-G, 76-P, 76-V (generically referred to as ART 76) which indicates committed register mappings representing, for each architectural register in the corresponding set of architectural registers 50, 52, 54, the physical register storing the latest committed architectural state for that architectural register.

When a given RCQ entry 80 is committed, that entry identifies whether the entry relates to an architectural general purpose register, architectural predicate register or architectural vector register, and the committed RCQ entry is provided to the corresponding one of the reclaim circuits 75-G, 75-P, 75-V that handles register reclaim for that type of architectural register. The relevant reclaim circuit 75 looks up the architectural register specified in the committed RCQ entry in the relevant ART 76 related to that type of architectural register, obtains the physical register identifier specified as mapped to that architectural register in the ART 76 (this physical register identifier identifying a physical register being evicted from the ART), and updates the ART entry corresponding to the architectural register identifier specified by the committed RCQ entry, to indicate as the mapped physical register the physical register identified by the committed RCQ entry. Hence, the committed RCQ entry has effectively overwritten the corresponding entry of the ART 76, causing the speculative mapping assigned for the committed operation to become committed to state as part of the mappings represented in the ART 76. The reclaim circuit 75 may also update the free register list 72 to mark, as being freed for reallocation, the evicted physical register which was previously specified in the ART entry corresponding to the committed architectural register. In some examples, there may be at least one other condition (as well as eviction of the physical register from the ART 76) that should be satisfied before the free register list 72 is updated to mark the evicted physical register as freed.

Hence, for general purpose registers, these ART and free register list updates take place in the general purpose ART 76-G and general purpose free register list 72-G. For vector registers, the structures to update are the vector ART 76-V and vector free register list 72-V.

Figure 6:
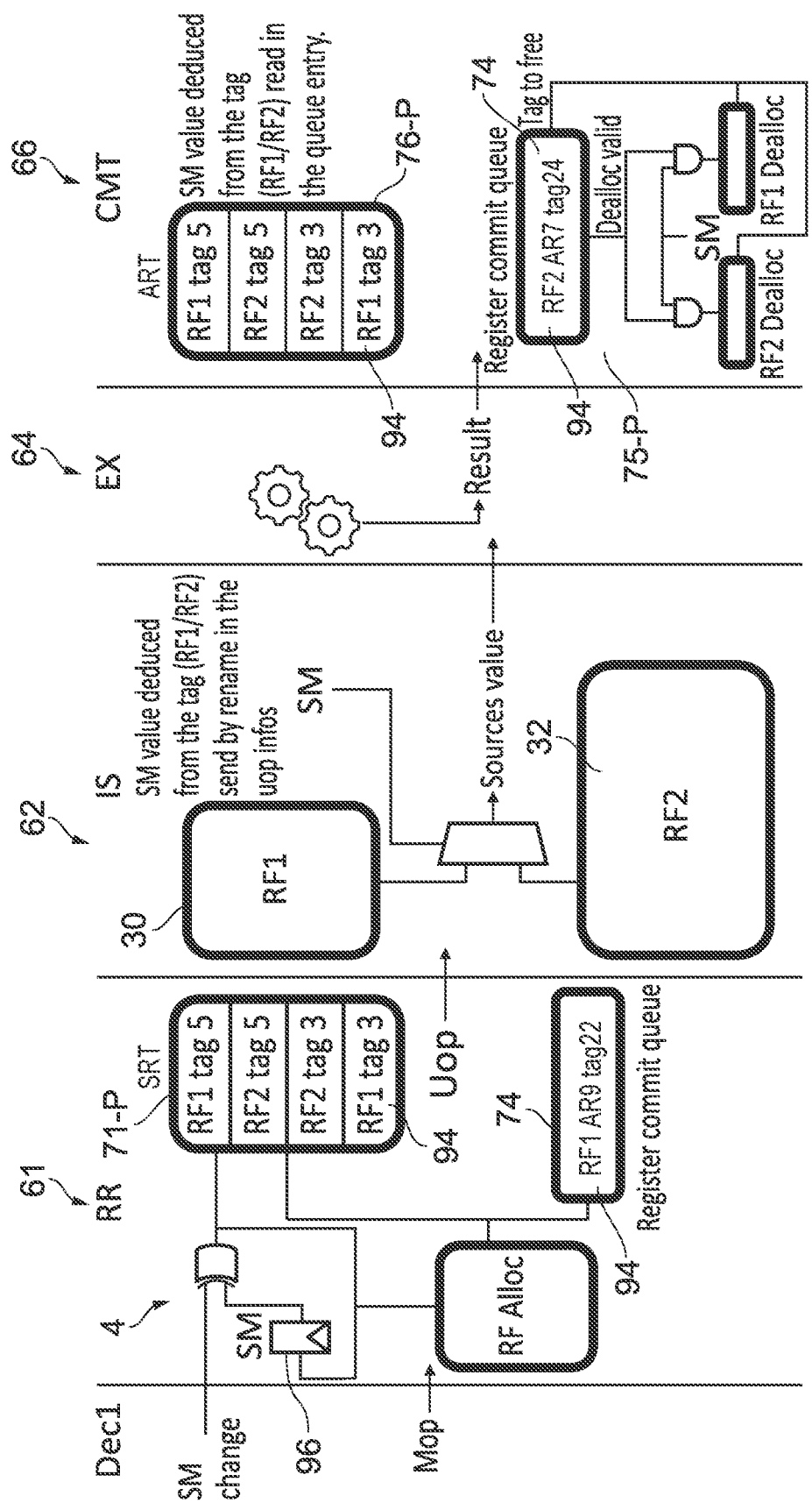
FIG. 6 illustrates an example of providing a register file selection indication in entries of rename tables and the register commit queue, for controlling whether physical registers corresponding to architectural registers of the first set are freed from the first physical register file or the second physical register file.
Figure 7:
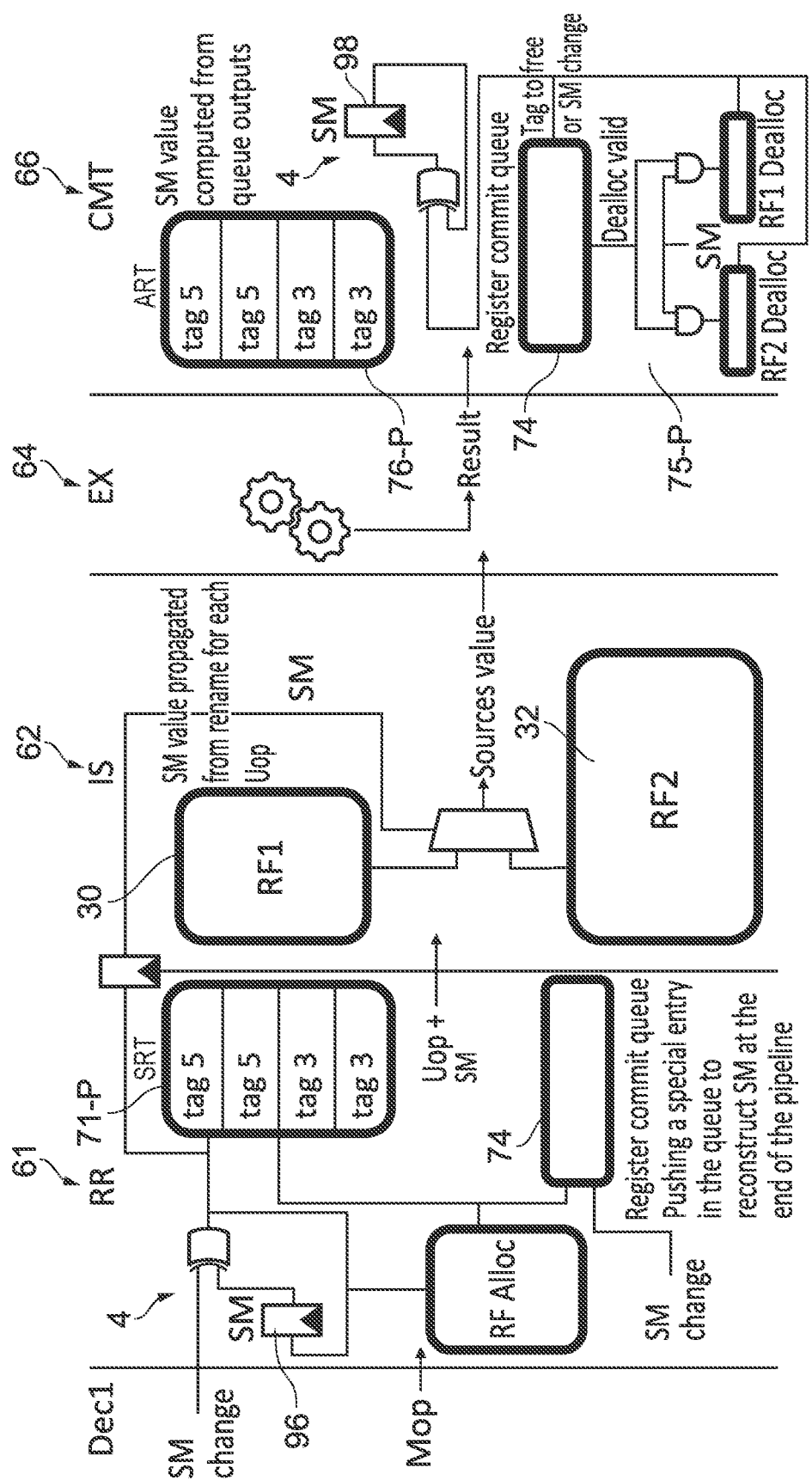
FIG. 7 illustrates an example of using a mode change indicating entry in a register commit queue to detect a transition between register mapping entries associated with the first and second modes respectively.

For predicate registers, the predicate ART 76-P is updated, but for freeing of physical registers, the predicate reclaim circuit 75-P can select whether to update either the general purpose free register list 72-G or the predicate register list 72-P, depending on whether the corresponding operation whose mapping was overwritten in the ART was processed in the non-streaming mode or the streaming mode. As shown in FIG. 6 and FIG. 7 discussed further below, there can be a number of different ways in which the reclaim circuit 75-P may be able to identify the mode in which the corresponding operation was processed, to allow a determination of whether to free the corresponding physical register from the general purpose physical register file 32 or the predicate physical register file 30.

If a branch misprediction, data value or address misprediction, or other form of incorrect speculation occurs, a pipeline flush may be performed to flush the pipeline of some incorrectly executed operations, and processing may be rewound to a previous point of program flow (e.g. by restoring the register mappings shown in the ART 76 to the SRT 72 and restarting execution from the operation corresponding to the commit point of program flow represented by the ART 76). This may cause various entries of the reorder buffer 73 to be flushed causing the corresponding RCQ entries to be (logically) flushed (it is not necessary to actually remove the flushed entries from the RCQ 74, as an equivalent operation can be to update the allocation pointer 86 associated with the RCQ 74 to point to the entry after the youngest non-flushed operation, so that subsequent allocations into the RCQ 74 may overwrite previous entries corresponding to the flushed operations). When an entry is flushed from the RCQ 74, the physical register identified by that entry can be freed from the relevant physical register file, and so the corresponding reclaim circuit 75 associated with the type of architectural register specified by the flushed RCQ entry may update the relevant free register list 72 to indicate that the physical register identified by the flushed entry can now be reallocated for other architectural registers. Again, for flushed RCQ entries corresponding to general purpose or vector registers, the corresponding free register list 72-G, 72-V is updated to indicate the register is free for reallocation in the general purpose register file 32 or vector register file 34, but for flushed RCQ entries corresponding to a predicate register, a choice is made of whether to update the general purpose free register list 72-G or the predicate free register list 72-P, depending on whether the mode associated with the flushed operation is the streaming mode or the non-streaming mode.

FIGS. 6 and 7 show two alternative techniques for enabling the predicate register reclaim circuitry 75-P to determine whether a physical register should be freed from the general purpose register file 32 or predicate register file 32 when a given RCQ entry is committed or flushed. While FIGS. 6 and 7 show two separate instances of the RCQ 74 in the rename stage 61 and commit stage 66 respectively, these represent the same physical data structure (so there may be only one instance of the data structure itself provided in hardware). The two instances of the RCQ 74 shown in FIGS. 6 and 7 represent the different timings at which the RCQ 74 is referenced, by the rename stage 61 when allocating a new register mapping for an operation, and by the commit stage 66 when dealing with commit/flush events.

In the example of FIG. 6, entries of the predicate SRT 71-P, ART 76-P and RCQ 74 are tagged with a register file selection indicator 94 which indicates, for predicate register mappings, whether the physical register for that mapping has been allocated in the predicate register file 30 or the general purpose register file 32. A corresponding register file selection indicator 94 also progresses through the pipeline together with the operation, to indicate to the issue stage 62 and execute stage 64 which register file is to be accessed for reading operands and writing results corresponding to predicate registers.

The mode change detection circuitry 4 may receive a signal indicating a detected streaming mode change (e.g. the signal may be triggered based on the execution of a mode changing instruction, or based on a change in state of the mode indicate state information 58), and the mode change detection circuitry 4 toggles the value of a current mode indicating value 96 when the signal is received.

The predicate rename circuitry 68-P determines based on the current mode indicating value 96 how to set the register file selection indicator 94 that is written to the SRT 71-P for a newly generated destination register mapping and is passed downstream with the corresponding operation. The register file selection indicator 94 is set to indicate the predicate register file 30 when the current mode indicating value 96 corresponds to the non-streaming mode and is set to indicate the general purpose register file 32 when the current mode indicating value 96 corresponds to the streaming mode.

At the commit stage 66, when an RCQ entry is logically removed from the RCQ 74 when the corresponding operation is committed, the predicate register reclaim circuitry 75-P determines, based on the register file selection indicator 94 specified in the entry of the ART 76-P corresponding to the architectural register specified in the committed RCQ entry, whether the physical register identified in that entry of the ART 76-P should be freed from the predicate free register list 72-P or the general purpose free register list 72-G. Also, when an RCQ entry is flushed from the RCQ 74, the predicate register reclaim circuitry 75-P determines, based on the register file selection indicator 94 specified in the flushed RCQ entry 74, whether the physical register identified in that entry of the ART 76-P should be freed from the predicate free register list 72-P or the general purpose free register list 72-G.

FIG. 7 shows a second example, in which a mode change indicating entry is allocated to the RCQ 74 in response to the mode change detection circuitry 4 detecting a streaming mode change. The mode change indicating entry is used by the reclaim circuitry 75-P to determine the transition between RCQ entries relating to operations processed in the non-streaming mode and RCQ entries relating to operations processed in the streaming mode. This approach can save circuit area because it avoids the need for each entry in the SRT 71-P, the ART 76-P and the RCQ 74 to be expanded to include the register file selection indicator 94.

Hence, in FIG. 7 the mode change detection circuitry 4 again maintains the current mode indicating value 96, and toggles the state of the mode change indicating value 96 in response to the signal indicating that a mode change has occurred. When such a mode change occurs, the mode change detection circuitry 4 or the register mapping circuitry 6 pushes to the RCQ 74 the mode change indicating entry, which has an encoding which is different from any valid encoding representing a mapping between architectural register and physical register. For example, there may be a reserved encoding which could be allocated to represent the mode change indicating entry.

Operations specifying architectural predicate registers pass through the pipeline tagged with the indication of which register file 30, 32 was selected for allocating the corresponding physical register, but in the example of FIG. 7 there is no need to specify such a register file specifying indication in the SRT 71-P or the entries of the RCQ 74 allocated for specifying register mappings.

At the commit stage, a further portion of the mode change detection circuitry 4 is provided which maintains a second mode indicating value 98. When the mode change indicating entry is logically removed from the RCQ 74 when bypassed by the commit pointer (as the commit point of program flow has overtaken the point of program flow at which the mode change occurred), or logically removed from the RCQ 74 on a flush (when the commit pointer is updated to point to an older entry than the mode change indicating entry), the mode change detection circuitry 4 flips the state of the second mode indicating value 98 to indicate that the current mode of operation is the opposite one of the non-streaming mode and streaming mode compared to before the mode change indicating entry was committed or flushed.

When an RCQ entry representing a register mapping is committed or flushed, the predicate register reclaim circuitry 75-P determines based on the second mode indicating value 98 whether a physical register (specified by the flushed RCQ entry or specified in the entry of the ART 76-P to be overwritten with a committed RCQ entry) should be freed (deallocated) from the predicate register file 30 or the general purpose register file 32, and the corresponding free register list 72-P, 72-G is updated accordingly.

FIGS. 8 to 14 illustrate flow diagrams illustrating methods performed in the examples described above. For each flow diagram, while for the sake of example steps are shown the certain logical sequence, it will be appreciated that the same functions could be carried out with some of the steps reordered or performed at least partially in parallel.

Figure 8:
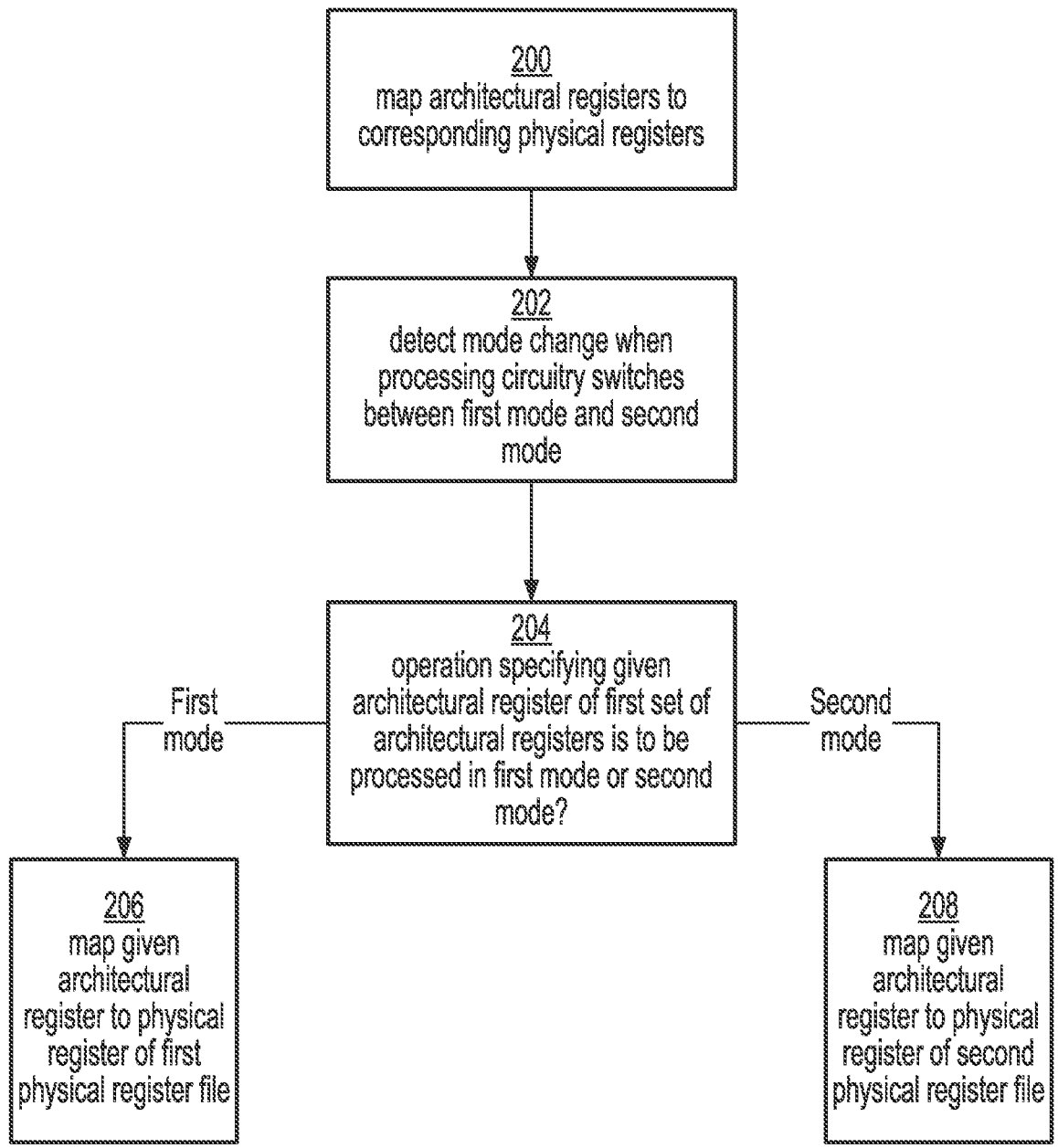
FIG. 8 illustrates a method of mapping architectural registers to physical registers.

FIG. 8 illustrates a method for controlling register mapping. At step 200 register mapping circuitry 6 maps architectural registers to corresponding physical registers. At step 202, the mode change detection circuitry 4 detects a mode change when processing circuitry switches between a first mode of processing (e.g. the non-streaming mode) and a second mode of processing (e.g. the streaming mode). At step 204, the register mapping circuitry determines whether an operation specifying a given architectural register of a first set of architectural registers (e.g. the predicate registers 54) is to be processed in the first mode or the second mode. If the operation is to be processed in the first mode, then at step 206 the given architectural register is mapped to a physical register of a first physical register file (e.g. the predicate register file 30). If the operation is to be processed in the second mode, then at step 208 the given architectural register is mapped to a physical register of second physical register file brackets e.g. the general purpose register file 32).

Figure 9:
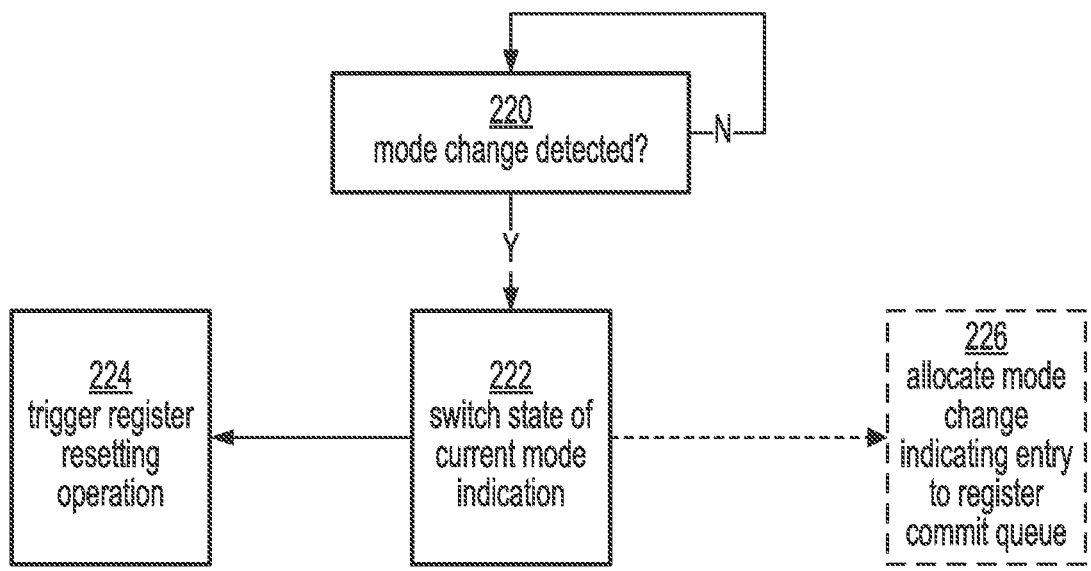
FIG. 9 illustrates mode change detection.

FIG. 9 illustrates a method for responding to a mode change. At step 220, the mode change detection circuitry 4 detects the mode change, for example based on the execution of the mode changing instruction (which could be either a dedicated opcode representing a streaming mode change, or a general purpose system register updating instruction which specifies a parameter identifying that the mode indicating state information 58 is the parameter to be updated by that instruction). In response to the mode changing instruction, at step 222 the processor 20 updates the architecturally defined mode indicating state information 58. The mode change detection circuitry 4 may also update any local micro-architectural mode indicating value 96 used by the register mapping circuitry 6 at the rename stage 61 to track which mode is the current mode.

In response to the mode change occurring, at step 224 the register mapping circuitry 6 triggers a register resetting operation to ensure that, for a given operation processed following the mode change which specifies a particular architectural register of the first set of architectural registers for providing a source operand without any intervening operation having written to the particular architectural register between the mode change and the given operation, the source operand is treated as having a predetermined value. For example, each of the physical registers currently mapped to architectural predicate registers 54 may be cleared to the predetermined value. The predetermined value could be zero or could be an predetermined non-zero value. The architectural vector registers 52 may also be architecturally reset to the predetermined value in response the mode change. This ensures a consistent starting point for the architectural state associated with the predicate and vector registers 54, 52 following a mode transition, which can reduce the need for architectural state to be transferred between the coprocessor 40 and processor 20 on a mode change.

If the approach shown in FIG. 7 is used for enabling the commit stage to determine which register file was used for allocating the physical register corresponding to a predicate register, then in response the mode change, at step 226 mode change indicating entry is also allocated into the RCQ entry 74. Step 226 is not performed if the approach shown in FIG. 6 is used.

Figure 10:
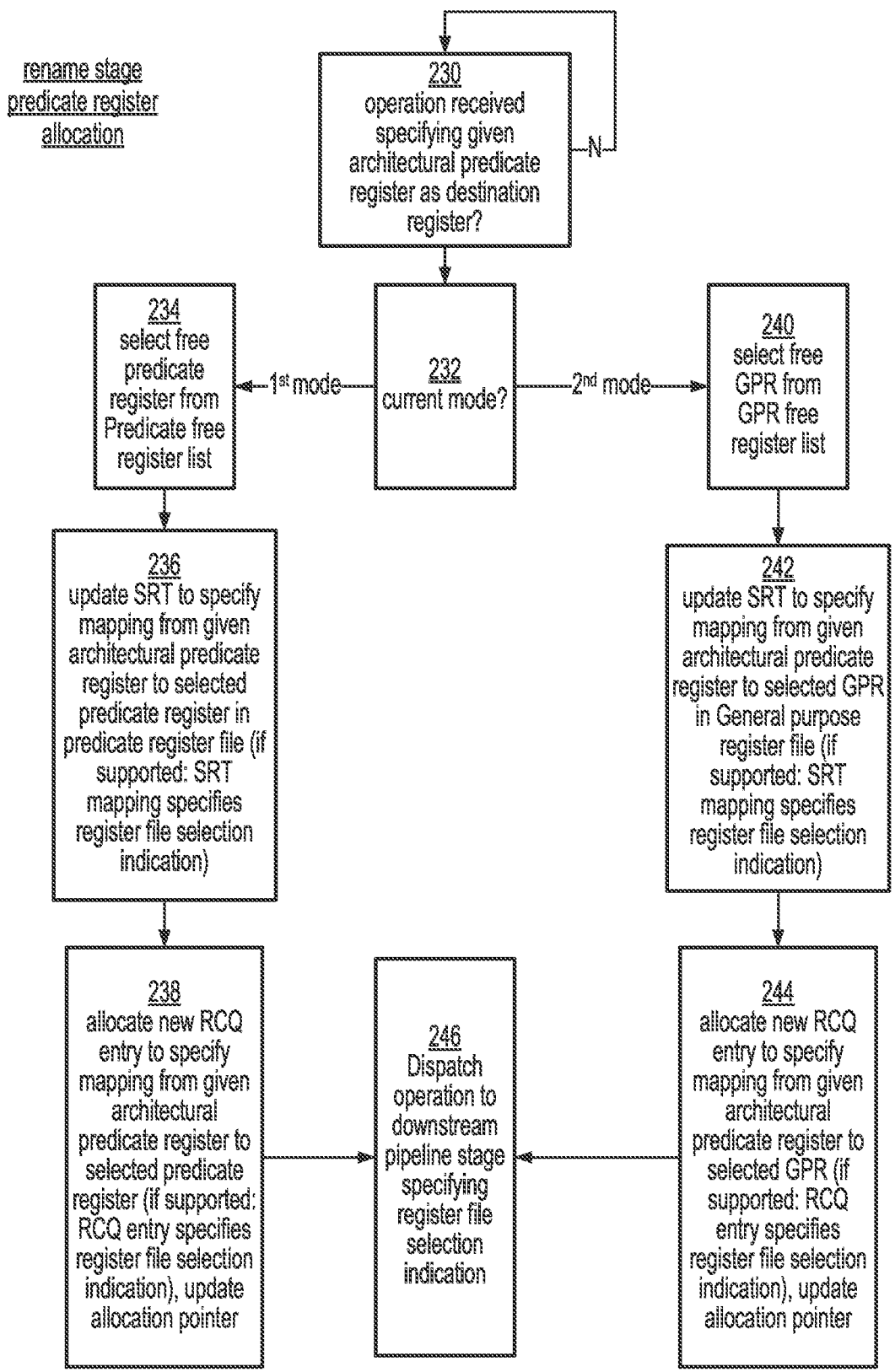
FIG. 10 illustrates rename stage predicate register allocation.

FIG. 10 illustrates a method of controlling allocation of physical registers corresponding to architectural predicate registers at the rename stage. At step 230, an operation is received by the rename stage 61 which specifies a given architectural predicate register as destination register (as noted above, for registers used as source register, the current mapping can simply be read from the SRT-FIG. 10 focuses on new allocations generated for destination registers). The predicate register mapping circuitry 68-P is provided with an identifier of the given architectural predicate register, and at step 232 checks the current mode of processing associated with the operation (e.g. determining the current mode based on the micro-architectural indication 96 of the current mode maintained by the mode change detection circuitry 4).

If the current mode is the first mode, then at step 234 the predicate register mapping circuitry 68-P selects a physical register of the predicate register file 30 that is identified as free (not already allocated) in the predicate free register list 72-P. At step 236 the predicate register mapping circuitry 68-P updates the entry of the SRT 71-P corresponding to the given architectural predicate register, to specify the selected physical register selected at step 234, so as to map the architectural predicate register speculatively to a physical register in the predicate register file 30. If the approach shown in FIG. 6 is used, the SRT mapping allocated to the SRT 71-P may also specify the register file selection indication 94 identifying that the physical register for this mapping was allocated in the predicate register file 30. At step 238 a new RCQ entry specifying the mapping from the given architectural predicate register to the selected predicate register is allocated to the RCQ 74 (at an entry determined with reference to the allocation pointer 86), and the RCQ allocation pointer 86 is updated to advance to the next entry of the RCQ. If the approach shown in FIG. 6 is used, the new RCQ entry specifies the register file selection indication 94 indicating that the physical register for that mapping was allocated in the predicate register file 30. The register file selection indication 94 is omitted from both the SRT entry updated at step 236 and RCQ entry allocated at step 238 if the approach shown in FIG. 7 is used.

If the current mode is the second mode, then at step 240 the predicate register mapping circuitry 68-P selects a physical register of the general purpose register file 32 that is identified as free in the general purpose free register list 72-G. At step 242 the predicate register mapping circuitry 68-P updates the entry of the SRT 71-P corresponding to the given architectural predicate register, to specify the selected physical register selected at step 240, so as to map the architectural predicate register speculatively to a physical register in the general purpose register file 32. If the approach shown in FIG. 6 is used, the SRT mapping allocated to the SRT 71-P also specifies the register file selection indication 94 identifying that the physical register for this mapping was allocated in the general purpose register file 32. At step 244 a new RCQ entry specifying the mapping from the given architectural predicate register to the selected predicate register is allocated to the RCQ 74 (at an entry determined with reference to the allocation pointer 86), and the RCQ allocation pointer 86 is updated to advance to the next entry of the RCQ. Again, if the approach shown in FIG. 6 is used, the new RCQ entry specifies the register file selection indication 94, this time specifying that the physical register for that mapping has been allocated in the general purpose register file 32. The register file selection indication 94 is omitted from both the SRT entry and RCQ entry if the approach shown in FIG. 7 is used.

Regardless of which mode is the current mode, at step 246 the operation requiring the predicate register is dispatched to a downstream pipeline stage (e.g. the issue stage 62) specifying a register file selection indication indicating which register file was used to allocate the physical register corresponding to an architectural predicate register.

Figure 11:
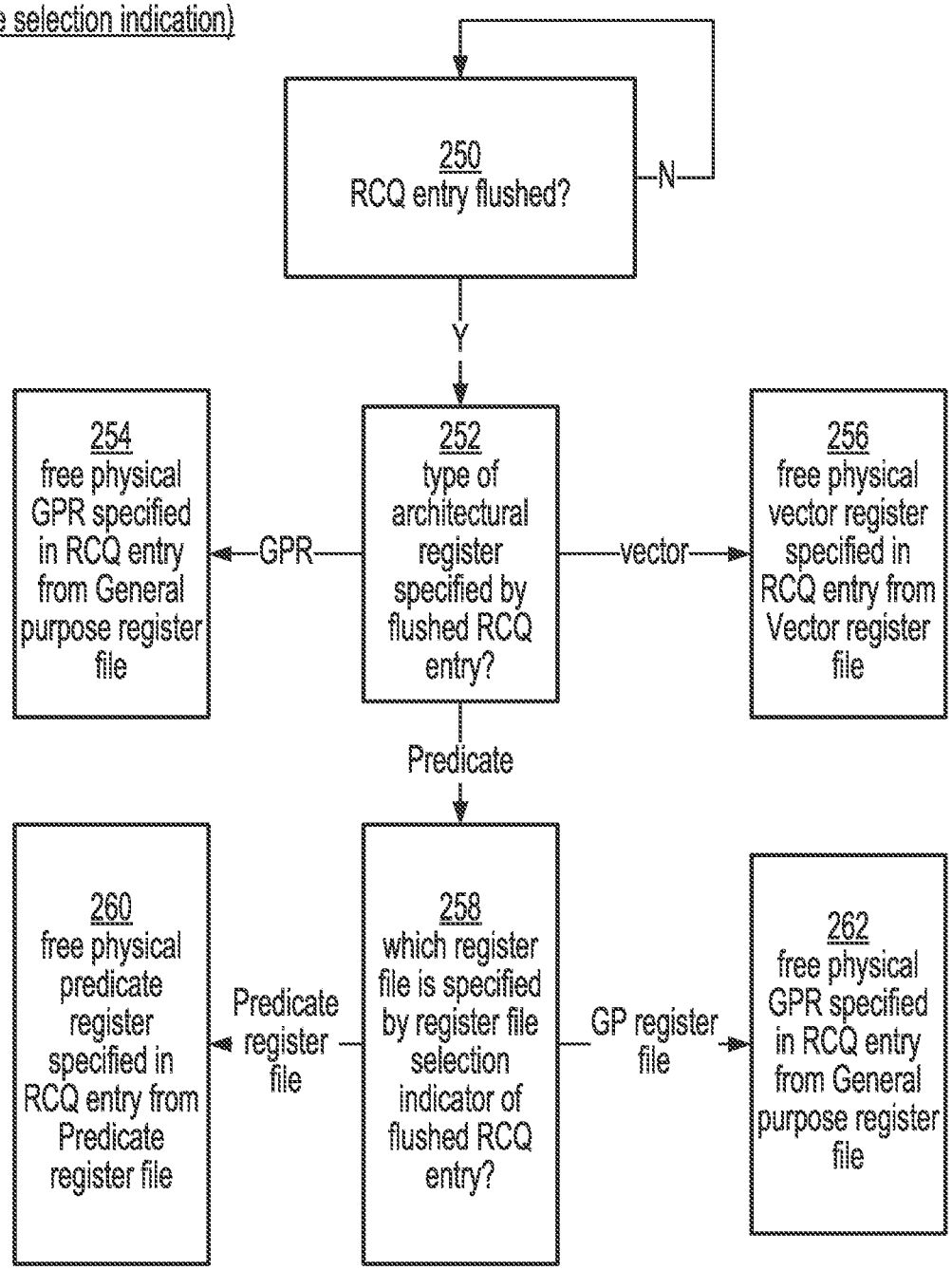
FIGS. 11 and 12 illustrate two alternative methods for controlling predicate register reclaim when an operation is flushed from the pipeline.

FIG. 11 illustrates a method of performing predicate register reclaim when an RCQ entry is flushed, in an implementation using the approach shown in FIG. 6. At step 250, the reclaim circuitry 70 detects that an RCQ entry has been flushed. An RCQ entry is detected as flushed when a flush event occurs which causes the commit pointer to be rewound to point to an older entry than the flushed RCQ entry. In response to the RCQ entry being flushed, at step 252 the reclaim circuitry 70 determines the type of architectural register specified by the flushed RCQ entry. If the flushed entry specifies a general purpose architectural register, then at step 254 the general purpose reclaim circuitry 75-G updates the general purpose free register list 72-G to mark the physical register specified in the flushed RCQ entry as free to be reallocated. If the flushed entry specifies a vector architectural register, then at step 256 the vector reclaim circuitry 75-V updates the vector free register list 72-V to mark the physical register specified in the flushed RCQ entry as free to be reallocated.

If the flushed entry specifies a predicate architectural register, then at step 258 the predicate reclaim circuitry 75-P determines which register file is specified by the register file selection indicator 94 of the flushed RCQ entry. If the register file selection indicator 94 specifies the predicate register file, then at step 260 the predicate reclaim circuitry 75-P updates the predicate free register list 72-P to mark the physical register specified in the flushed RCQ entry as free to be reallocated. If the register file selection indicator 94 specifies the general purpose register file, then at step 262 the predicate reclaim circuitry 75-P updates the general purpose free register list 72-G to mark the physical register specified in the flushed RCQ entry as free to be reallocated.

Figure 12:
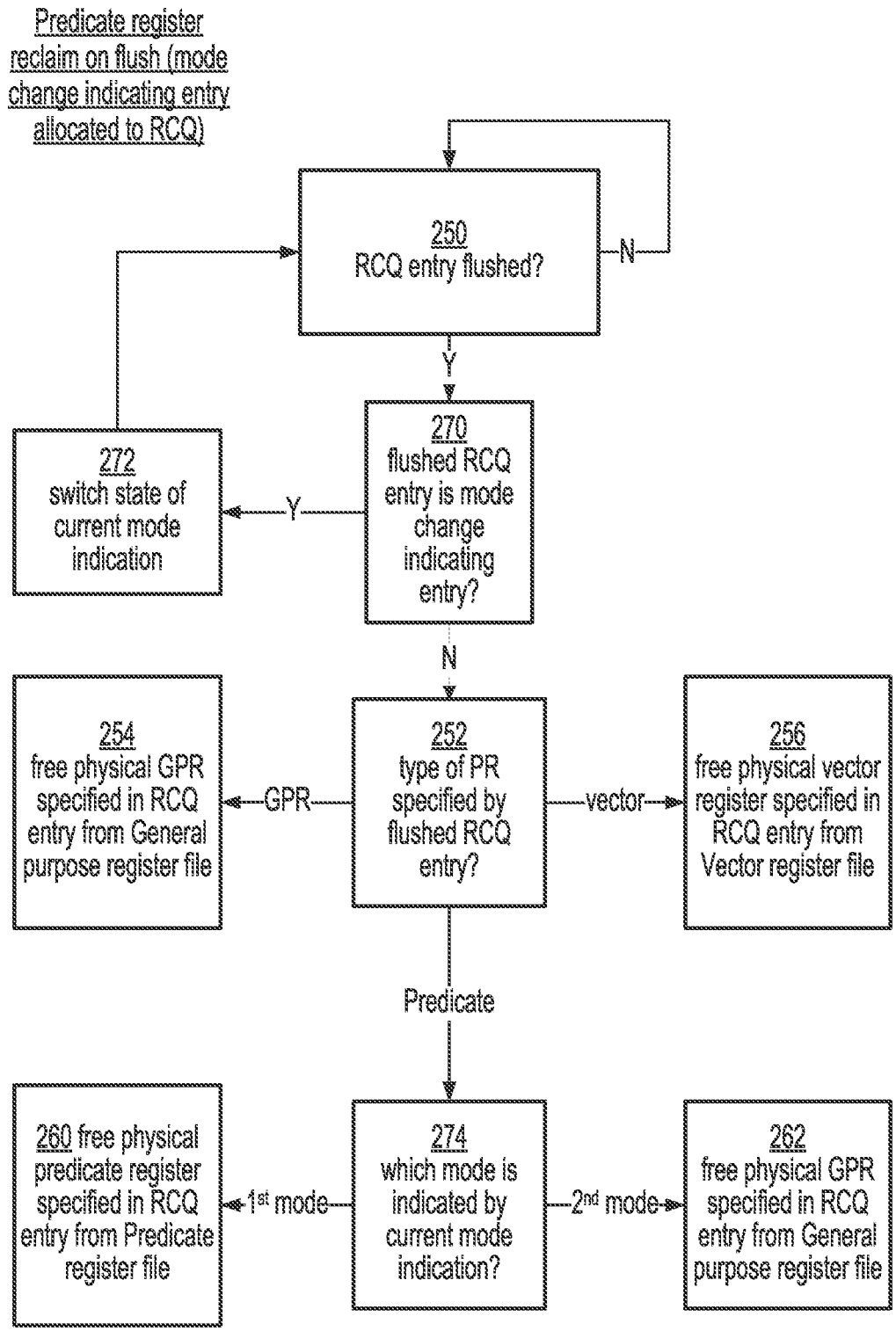

FIG. 12 illustrates a method of performing predicate register reclaim when an RCQ entry is flushed, in an implementation using the approach shown in FIG. 7. Steps 250, 252, 254, 256 are the same as in FIG. 11, and so if the flushed RCQ entry specifies an architectural general purpose or vector register, the physical register is freed from the general purpose physical register file 32 or vector physical register file 34 as described above for FIG. 11. However, in FIG. 12, in response to the RCQ entry being flushed, if the flushed RCQ entry is detected at step 270 to be a mode change indicating entry then at step 272 the current mode indication 98 (used to track the register file from which predicate registers should be reclaimed) is updated to switch states and indicate the opposite mode from the mode indicated before the mode change indicating entry was flushed. Also, if the flushed RCQ entry is detected at step 252 as specifying a predicate architectural register, then at step 274 the predicate register reclaim circuitry 75-P determines whether the current mode indication 98 indicates the first mode (non-streaming mode) or second mode (streaming mode). Step 260 (to update the predicate free register list 72-P to mark as free the physical predicate register specified in the flushed RCQ entry) is performed if the current mode indication 98 indicates the first mode, and step 262 (to update the general purpose register list 72-G to mark as free the physical general purpose register specified in the flushed RCQ entry) is performed if the current mode indication 98 indicates the second mode.

Figure 13:
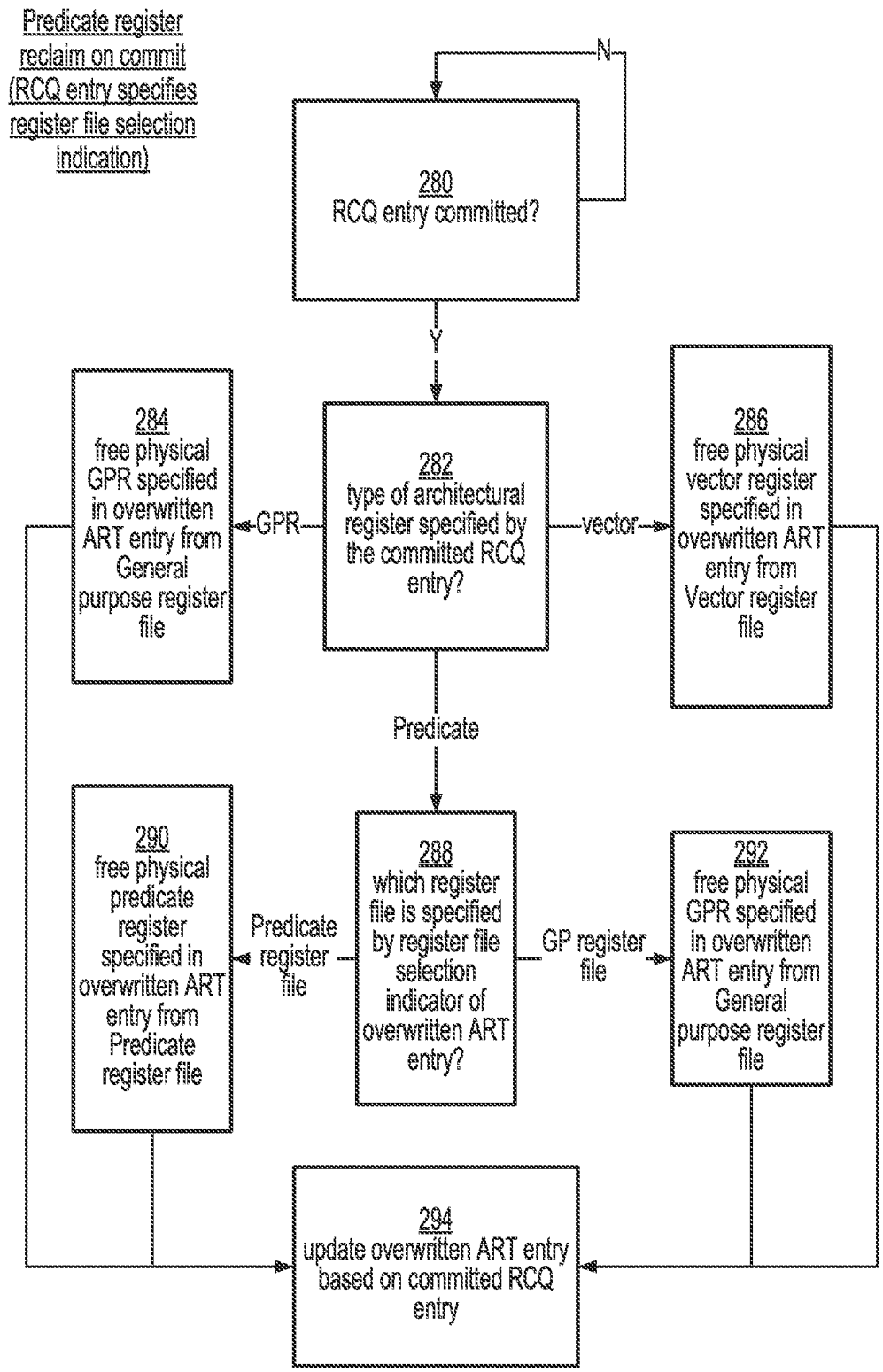
FIGS. 13 and 14 illustrate two alternative methods for controlling predicate register reclaim when an operation is committed.

FIG. 13 illustrates a method of performing predicate register reclaim when an RCQ entry is committed, in an implementation using the approach shown in FIG. 6. At step 280, the reclaim circuitry 70 detects that an RCQ entry has been committed (when the commit pointer advances (based on commitment of corresponding operations in the reorder buffer) to point to a younger entry than the committed RCQ entry). In response to detecting an RCQ entry being committed, at step 282 the reclaim circuitry 70 determines the type of architectural register specified by the committed RCQ entry. If the committed entry specifies a general purpose architectural register, then at step 284 the general purpose reclaim circuitry 75-G updates the general purpose free register list 72-G to mark, as free to be reallocated, the physical register specified in an overwritten ART entry of the ART 75-G which corresponds to the architectural register specified by the committed RCQ entry. If the committed entry specifies a vector architectural register, then at step 286 the vector reclaim circuitry 75-V updates the vector free register list 72-V to mark, as free to be reallocated, the physical register specified in an overwritten ART entry of the ART 75-V that corresponds to the architectural register specified by the committed RCQ.

If the committed entry specifies a predicate architectural register, then at step 288 the predicate reclaim circuitry 75-P determines which register file is specified by the register file selection indicator 94 of an overwritten ART entry of the ART 75-P which corresponds to the same architectural register as the committed RCQ entry. If the register file selection indicator 94 of the overwritten ART entry specifies the predicate register file then at step 290 the predicate reclaim circuitry 75-P updates the predicate free register list 72-P to mark the physical register specified in the overwritten ART entry as free to be reallocated in the predicate register file 30. If the register file selection indicator 94 specifies the general purpose register file then then at step 292 the predicate reclaim circuitry 75-P updates the general purpose free register list 72-G to mark the physical register specified in the overwritten ART entry as free to be reallocated in the general purpose register file 32.

Regardless of the type of architectural register specified by the committed RCQ entry, at step 294 the reclaim circuitry 70 updates the overwritten ART entry (selected from the relevant one of the ARTs 75-G, 75-P, 75-V corresponding to the type of architectural register specified by the committed RCQ entry), so that the overwritten ART entry now specifies the physical register identifier identified in the committed RCQ entry.

Figure 14:
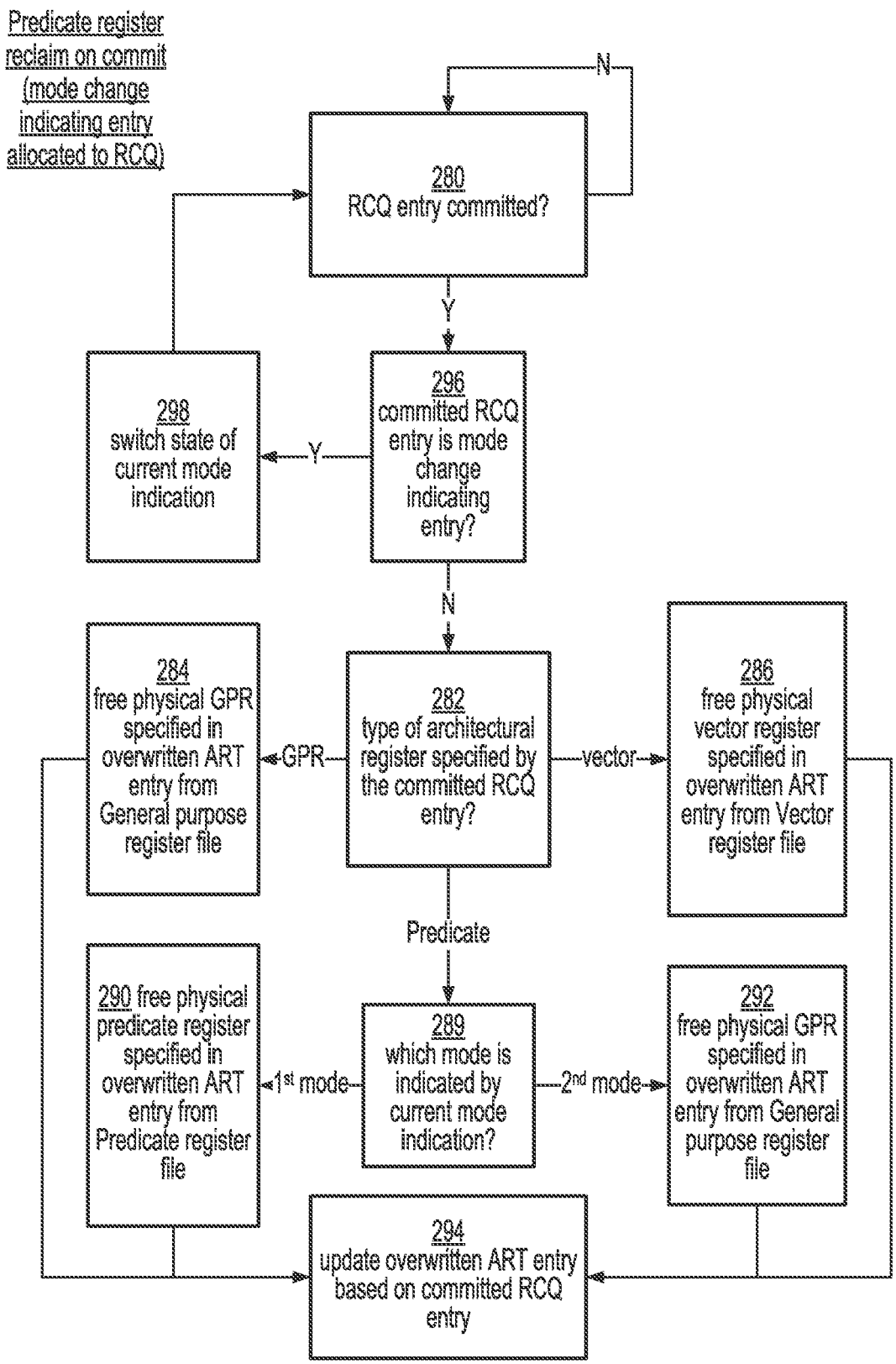

FIG. 14 illustrates a method of performing predicate register reclaim when a RCQ entry is committed, in an implementation using the approach shown in FIG. 7. Steps 280, 282, 286 are the same as in FIG. 11, and so if the committed RCQ entry specifies an architectural general purpose or vector register, the physical register is freed from the general purpose physical register file 32 or vector physical register file 34 as described above for FIG. 13. Also, step 294 of updating the overwritten ART entry based on the committed RCQ entry is the same as in FIG. 13.

However, in FIG. 14, in response to the RCQ entry being committed, if the committed RCQ entry is detected at step 296 to be a mode change indicating entry then at step 298 the current mode indication 98 (used to track the register file from which predicate registers should be reclaimed is updated) is toggled to switch states and indicate the opposite mode from the mode indicated before the mode change indicating entry was committed.

Also, if the committed RCQ entry is detected at step 282 as specifying a predicate architectural register, then at step 289 the predicate register reclaim circuitry 75-P determines whether the current mode indication 98 indicates the first mode (non-streaming mode) or second mode (streaming mode). Step 290 (to update the predicate free register list 72-P to mark as free the physical predicate register specified in the overwritten ART entry of ART 75-P) is performed if the current mode indication 98 indicates the first mode, and step 292 (to update the general purpose register list 72-G to mark as free the physical general purpose register specified in the overwritten ART of ART 75-P) is performed if the current mode indication 98 indicates the second mode.

While FIGS. 13 and 14 for conciseness show an approach where a physical register specified in an overwritten ART entry can be freed for reallocation upon commitment of the RCQ entry specifying an architectural register corresponding to the overwritten ART entry, other examples may also impose at least one other condition (other than eviction of the physical register from the ART) that should be satisfied before the physical register can be marked as free in the free register list.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 15:
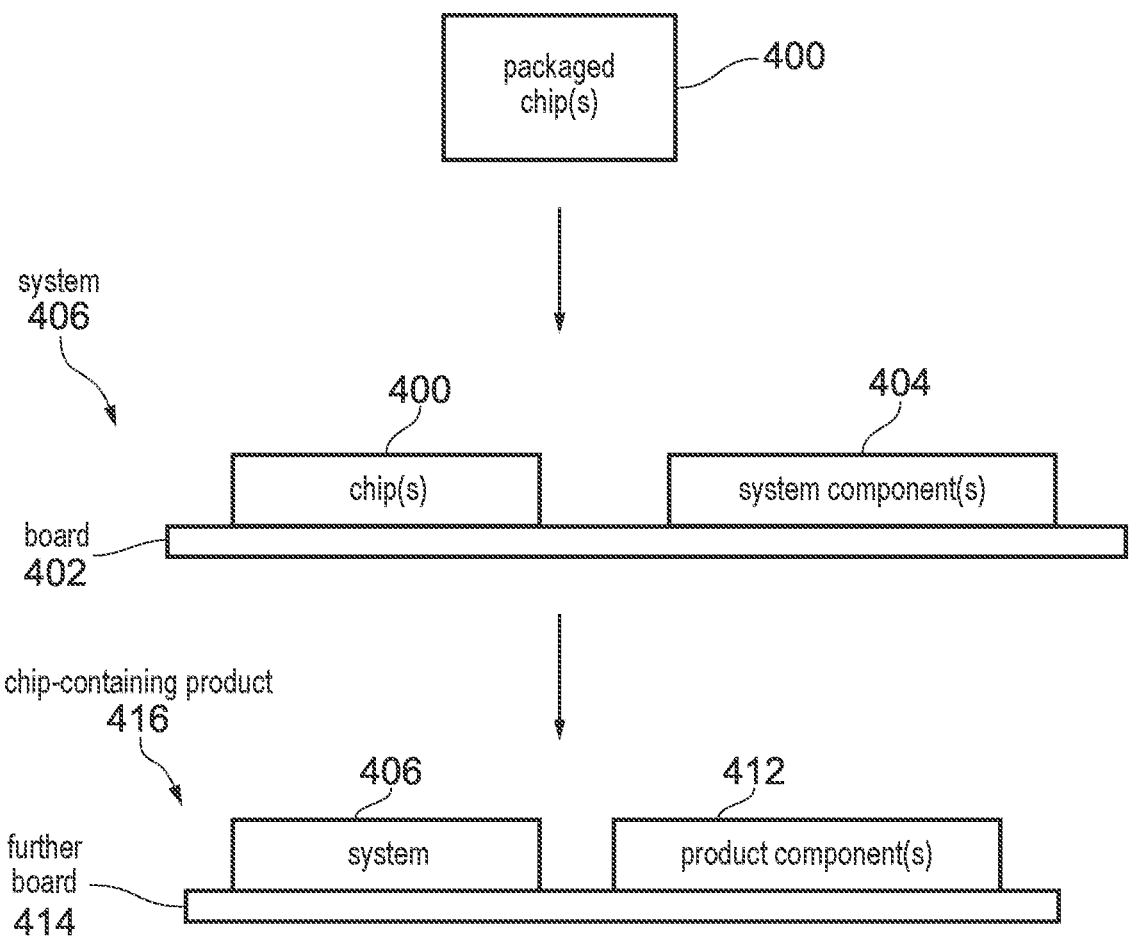
FIG. 15 illustrates a system and a chip-containing product.

As shown in FIG. 15, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus comprising:
   mode change detection circuitry to detect a mode change when processing circuitry switches between a first mode of processing in which a first set of architectural registers are designated as having a first register length and a second mode of processing in which the first set of architectural registers are designated as having a second register length different to the first register length; and
   register mapping circuitry to map architectural registers to corresponding physical registers;
   wherein for an operation specifying a given architectural register of the first set of architectural registers:
     in response to a determination that the operation is to be processed in the first mode of processing, the register mapping circuitry is configured to map the given architectural register to a physical register of a first physical register file; and
     in response to a determination that the operation is to be processed in the second mode of processing, the register mapping circuitry is configured to map the given architectural register to a physical register of a second physical register file separate from the first physical register file, the second physical register file comprising physical registers of different register length to physical registers of the first physical register file.

2. The apparatus according to clause 1, in which for an operation specifying a selected architectural register of a second set of architectural registers, the register mapping circuitry is configured to map the selected architectural register to a physical register of the second physical register file regardless of whether the operation is to be processed in the first mode of processing or the second mode of processing.

3. The apparatus according to clause 2, in which the second set of architectural registers comprise general purpose scalar registers for providing operands for scalar processing operations.

4. The apparatus according to any of clauses 1 to 3, in which the first set of architectural registers comprise predicate registers for providing predicate values for predicating SIMD (single instruction multiple data) operations.

5. The apparatus according to any of clauses 1 to 4, in which the second physical register file has a different number of physical registers than the first physical register file.

6. The apparatus according to any of clauses 1 to 5, in which, for an operation specifying an identified architectural register of a further set of architectural registers:
   in response to a determination that the operation is to be processed in the first mode of processing, the register mapping circuitry is configured to map the identified architectural register to a physical register of a third physical register file separate from the first physical register file and the second physical register file.

7. The apparatus according to clause 6, in which:
   in the second mode of processing, the register mapping circuitry is not responsible for mapping the identified architectural register to a corresponding physical register.

8. The apparatus according to clauses 6 and 7, in which:
   in the first mode of processing, operations specifying one of the further set of architectural registers are to be executed by first execution circuitry; and
   in the second mode of processing, operations specifying one of the further set of architectural registers are executed by second execution circuitry separate from the first execution circuitry using a fourth physical register file separate from the first physical register file, the second physical register file and the third physical register file.

9. The apparatus according to any of clauses 6 to 8, in which the further set of architectural registers are designated as having different register lengths in the first mode and second mode respectively.

10. The apparatus according to any of clauses 1 to 9, in which the mode change detection circuitry is configured to detect the mode change in response to at least one of:
    processing of a mode change instruction; and
    a change to mode indicating state information stored in a control register.

11. The apparatus according to any of clauses 1 to 10, in which the register mapping circuitry is configured to trigger a register resetting operation in response to the mode change to ensure that, for a given operation processed following the mode change which specifies a particular architectural register of the first set of architectural registers for providing a source operand without any intervening operation having written to the particular architectural register between the mode change and the given operation, the source operand is treated as having a predetermined value.

12. The apparatus according to any of clauses 1 to 11, in which the register mapping circuitry is configured to dispatch, to a subsequent pipeline stage, the operation specifying the given architectural register of the first set of architectural registers associated with a register file selection indication indicative of whether the physical register mapped to the given architectural register is a physical register of the first physical register file or the second physical register file.

13. The apparatus according to any of clauses 1 to 12, comprising register reclaim circuitry to determine, following an operation specifying one of the first set of architectural registers being committed or flushed, whether at least one physical register to be freed for reallocation is to be freed from the first physical register file or the second physical register file.

14. The apparatus according to clause 13, comprising a register commit queue comprising a plurality of register mapping entries representing a queue of register mappings associated with respective points of program flow;
    wherein the register reclaim circuitry is configured to identify a given physical register to be freed for reallocation based on a committed or flushed register mapping entry of the register commit queue.

15. The apparatus according to clause 14, in which:
    in response to detecting the mode change, the mode change detection circuitry is configured to allocate to the register commit queue a mode change indicating entry indicative of the mode change; and the register reclaim circuitry is configured to detect, based on the mode change indicating entry, a transition between a first set of register mapping entries corresponding to operations processed in the first mode and a second set of register mapping entries corresponding to operations processed in the second mode.

16. The apparatus according to clause 14, in which the register reclaim circuitry is configured to detect, based on a register file selection indication specified by the flushed register mapping entry or a register file selection indication specified by a corresponding rename table entry corresponding to an architectural register specified by the committed register mapping entry, whether a physical register indicated by the flushed register mapping entry or the corresponding rename table entry as mapped to one of the first set of architectural registers should be freed from the first physical register file or the second physical register file.

17. A system comprising:
the apparatus of any preceding clause, implemented in at least one packaged chip;
at least one system component; and
a board,
wherein the at least one packaged chip and the at least one system component are assembled on the board.

18. A chip-containing product comprising the system of clause 17 assembled on a further board with at least one other product component.

19. A non-transitory computer-readable medium to store computer-readable code for fabrication of an apparatus comprising:
mode change detection circuitry to detect a mode change when processing circuitry switches between a first mode of processing in which a first set of architectural registers are designated as having a first register length and a second mode of processing in which the first set of architectural registers are designated as having a second register length different to the first register length; and
register mapping circuitry to map architectural registers to corresponding physical registers;
wherein for an operation specifying a given architectural register of the first set of architectural registers:
in response to a determination that the operation is to be processed in the first mode of processing, the register mapping circuitry is configured to map the given architectural register to a physical register of a first physical register file; and
in response to a determination that the operation is to be processed in the second mode of processing, the register mapping circuitry is configured to map the given architectural register to a physical register of a second physical register file separate from the first physical register file, the second physical register file comprising physical registers of different register length to physical registers of the first physical register file.

20. A method comprising:
mapping architectural registers to corresponding physical registers; and
detecting a mode change when processing circuitry switches between a first mode of processing in which a first set of architectural registers are designated as having a first register length and a second mode of processing in which the first set of architectural registers are designated as having a second register length different to the first register length;
wherein for an operation specifying a given architectural register of the first set of architectural registers:
in response to a determination that the operation is to be processed in the first mode of processing, the given architectural register is mapped to a physical register of a first physical register file; and
in response to a determination that the operation is to be processed in the second mode of processing, the given architectural register is mapped to a physical register of a second physical register file separate from the first physical register file, the second physical register file comprising physical registers of different register length to physical registers of the first physical register file.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:
1. An apparatus comprising:
mode change detection circuitry to detect a mode change when processing circuitry switches between a first mode of processing in which a first set of architectural registers are designated as having a first register length and a second mode of processing in which the first set of architectural registers are designated as having a second register length different to the first register length; and
hardware register mapping circuitry to map architectural registers to corresponding physical registers;
wherein for an operation specifying a given architectural register of the first set of architectural registers:
in response to a determination that the operation is to be processed in the first mode of processing, the hardware register mapping circuitry is configured to map the given architectural register to a physical register of a first physical register file; and
in response to a determination that the operation is to be processed in the second mode of processing, the hardware register mapping circuitry is configured to map the given architectural register to a physical register of a second physical register file separate from the first physical register file, the second physical register file comprising physical registers of different register length to physical registers of the first physical register file.

2. The apparatus according to claim 1, in which for an operation specifying a selected architectural register of a second set of architectural registers, the hardware register mapping circuitry is configured to map the selected architectural register to a physical register of the second physical register file regardless of whether the operation specifying the selected architectural register is to be processed in the first mode of processing or the second mode of processing.

3. The apparatus according to claim 2, in which the second set of architectural registers comprise general purpose scalar registers for providing operands for scalar processing operations.

4. The apparatus according to claim 1, in which the first set of architectural registers comprise predicate registers for providing predicate values for predicating SIMD (single instruction multiple data) operations.

5. The apparatus according to claim 1, in which the second physical register file has a different number of physical registers than the first physical register file.

6. The apparatus according to claim 1, in which, for an operation specifying an identified architectural register of a further set of architectural registers:
in response to a determination that the operation specifying the identified architectural register is to be processed in the first mode of processing, the hardware register mapping circuitry is configured to map the identified architectural register to a physical register of a third physical register file separate from the first physical register file and the second physical register file.

7. The apparatus according to claim 6, in which:
in the second mode of processing, the hardware register mapping circuitry is not responsible for mapping the identified architectural register to a corresponding physical register.

8. The apparatus according to claim 6, in which:
in the first mode of processing, operations specifying one of the further set of architectural registers are to be executed by first execution circuitry; and
in the second mode of processing, operations specifying one of the further set of architectural registers are executed by second execution circuitry separate from the first execution circuitry using a fourth physical register file separate from the first physical register file, the second physical register file and the third physical register file.

9. The apparatus according to claim 6, in which the further set of architectural registers are designated as having different register lengths in the first mode and the second mode respectively.

10. The apparatus according to claim 1, in which the mode change detection circuitry is configured to detect the mode change in response to at least one of:
processing of a mode change instruction; and
a change to mode indicating state information stored in a control register.

11. The apparatus according to claim 1, in which the hardware register mapping circuitry is configured to trigger a register resetting operation in response to the mode change to ensure that, for a given operation processed following the mode change which specifies a particular architectural register of the first set of architectural registers for providing a source operand without any intervening operation having written to the particular architectural register between the mode change and the given operation, the source operand is treated as having a predetermined value.

12. The apparatus according to claim 1, in which the hardware register mapping circuitry is configured to dispatch, to a subsequent pipeline stage, the operation specifying the given architectural register of the first set of architectural registers, wherein the given architectural register is associated with a register file selection indication indicative of whether the physical register mapped to the given architectural register is a physical register of the first physical register file or the second physical register file.

13. The apparatus according to claim 1, comprising register reclaim circuitry to determine, following an operation specifying one of the first set of architectural registers being committed or flushed, whether at least one physical register to be freed for reallocation is to be freed from the first physical register file or the second physical register file.

14. The apparatus according to claim 13, comprising a register commit queue comprising a plurality of register mapping entries representing a queue of register mappings associated with respective points of program flow;
wherein the register reclaim circuitry is configured to identify a given physical register to be freed for reallocation based on a committed or flushed register mapping entry of the register commit queue.

15. The apparatus according to claim 14, in which:
in response to detecting the mode change, the mode change detection circuitry is configured to allocate to the register commit queue a mode change indicating entry indicative of the mode change; and
the register reclaim circuitry is configured to detect, based on the mode change indicating entry, a transition between a first set of register mapping entries corresponding to operations processed in the first mode and a second set of register mapping entries corresponding to operations processed in the second mode.

16. The apparatus according to claim 14, in which the register reclaim circuitry is configured to detect, based on a register file selection indication specified by the flushed register mapping entry or a register file selection indication specified by a corresponding rename table entry corresponding to an architectural register specified by the committed register mapping entry, whether a physical register indicated by the flushed register mapping entry or the corresponding rename table entry as mapped to one of the first set of architectural registers should be freed from the first physical register file or the second physical register file.

17. A system comprising:
the apparatus of claim 1, implemented in at least one packaged chip;
at least one system component; and
a board,
wherein the at least one packaged chip and the at least one system component are assembled on the board.

18. A chip-containing product comprising the system of claim 17 assembled on a further board with at least one other product component.

19. A non-transitory computer-readable medium to store computer-readable code for fabrication of an apparatus comprising:
mode change detection circuitry to detect a mode change when processing circuitry switches between a first mode of processing in which a first set of architectural registers are designated as having a first register length and a second mode of processing in which the first set of architectural registers are designated as having a second register length different to the first register length; and register mapping circuitry to map architectural registers to corresponding physical registers;

wherein for an operation specifying a given architectural register of the first set of architectural registers:
- in response to a determination that the operation is to be processed in the first mode of processing, the register mapping circuitry is configured to map the given architectural register to a physical register of a first physical register file; and
- in response to a determination that the operation is to be processed in the second mode of processing, the register mapping circuitry is configured to map the given architectural register to a physical register of a second physical register file separate from the first physical register file, the second physical register file comprising physical registers of different register length to physical registers of the first physical register file.

20. A method comprising:

mapping architectural registers to corresponding physical registers; and detecting a mode change when processing circuitry switches between a first mode of processing in which a first set of architectural registers are designated as having a first register length and a second mode of processing in which the first set of architectural registers are designated as having a second register length different to the first register length;

wherein for an operation specifying a given architectural register of the first set of architectural registers:
- in response to a determination that the operation is to be processed in the first mode of processing, the given architectural register is mapped to a physical register of a first physical register file; and
- in response to a determination that the operation is to be processed in the second mode of processing, the given architectural register is mapped to a physical register of a second physical register file separate from the first physical register file, the second physical register file comprising physical registers of different register length to physical registers of the first physical register file.

\* \* \* \* \*